Oct. 21, 1969 F. L. RIEGER ET AL 3,474,234

ENCODED TAG READER

Filed Oct. 3, 1967 11 Sheets-Sheet 1

INVENTORS
Frederic L. Rieger
BY Jack I. Kern
William F. Utzinger
Wood, Herron and Evans
ATTORNEYS Oct. 21, 1969 F. L. RIEGER ET AL 3,474,234

ENCODED TAG READER

Filed Oct. 3, 1967 11 Sheets-Sheet 2

ENCODED INFORMATION

START MESSAGE (↓) — SPACE CODE (↓)

| POSITION WITHIN CHARACTER | 1 | 2 | 3 | 4 | 5 | 6 | 7 | 8 | 9 | 0 | X | ↓ (START MESSAGE) | ◇ | ↓ (SPACE CODE) | FOR |
|---|---|---|---|---|---|---|---|---|---|---|---|---|---|---|---|
| A | X | | X | | X | | X | | X | | X | | X | | X |
| B | | X | X | | | X | X | | | X | X | | | X | X |
| C | | | | X | X | X | X | | | | | X | X | X | X |
| D | | | | | | | | X | X | X | X | X | X | X | X |
| E | X | X | | X | | | X | X | | | X | | X | X | |

INVENTORS
Frederic L. Rieger
Jack I. Kern
William F. Utzinger
BY Wood, Herron & Evans
ATTORNEYS

ENCODED TAG READER

INVENTORS
Frederic L. Rieger
BY Jack I. Kern
William F. Utzinger
Wood, Herron & Evans
ATTORNEYS Oct. 21, 1969 F. L. RIEGER ET AL 3,474,234

ENCODED TAG READER

Filed Oct. 3, 1967 11 Sheets-Sheet 4

INVENTORS
Frederic L. Rieger
Jack I. Kern
William F. Utzinger
BY Wood, Herron & Evans
ATTORNEYS INVENTORS
Frederic L. Rieger
BY Jack S. Kern
William F. Utzinger
Wood, Herron & Evans
ATTORNEYS

ENCODED TAG READER

INVENTORS
Frederic L. Rieger
Jack I. Kern
William F. Utzinger
BY Wood, Herron and Evans
ATTORNEYS

ENCODED TAG READER

Filed Oct. 3, 1967 11 Sheets-Sheet 7

INVENTORS
Frederic L. Rieger
BY Jack I. Kern
William F. Utzinger
Wood, Herron & Evans
ATTORNEYS

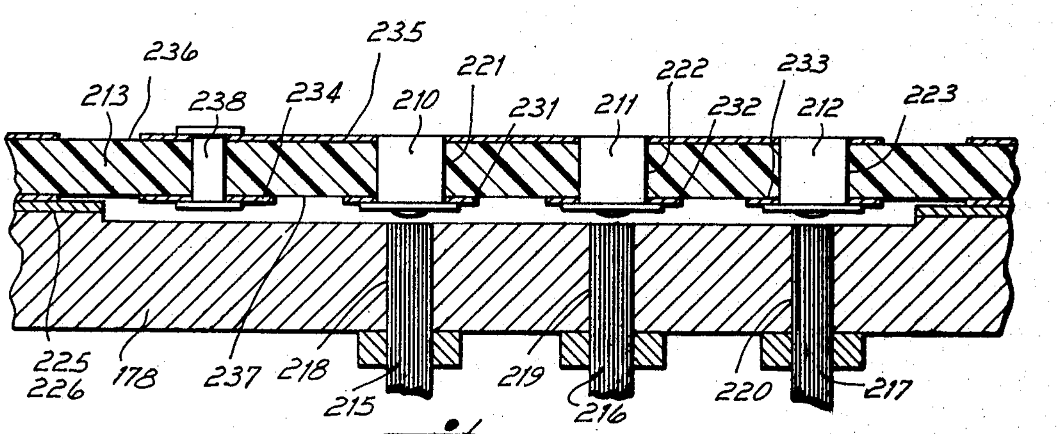
FIG. 18
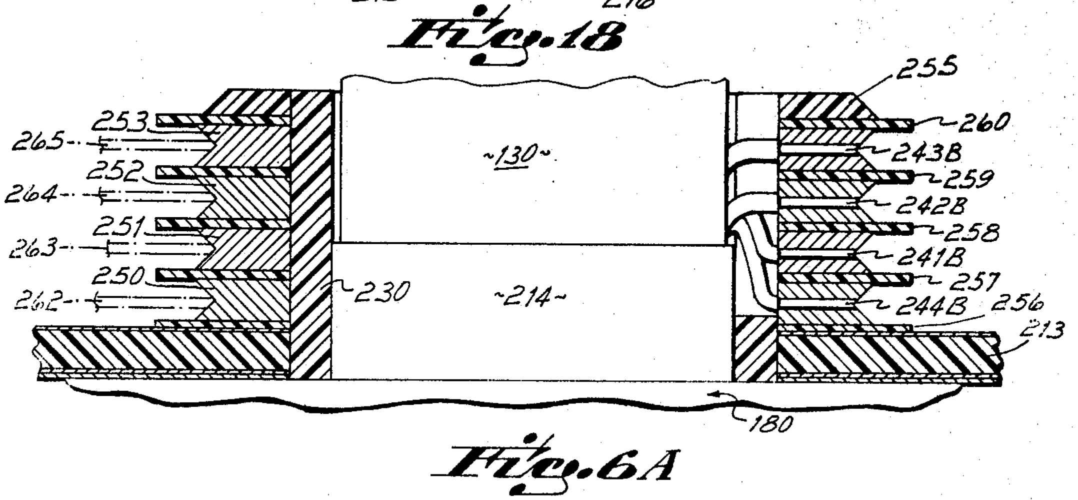
FIG. 6A
| INPUT | OUTPUT | |
|---|---|---|
| R=0 | Q=0 | $\bar{Q}$=1 |
| P=0 | Q=1 | $\bar{Q}$=0 |
FIG. 20
| INPUTS | OUTPUT |
|---|---|
| ALL 0 | 1 |
| ALL 1 | 0 |
| 0 AND 1 | 1 |
FIG. 21
| INPUTS | | | | OUTPUTS | |
|---|---|---|---|---|---|
| CL | R | J | K | Q | $\bar{Q}$ |
| 0 | 1 | 1 | 0 | 1 | 0 |
| 0 OR 1 | 0 | 0 OR 1 | 0 OR 1 | 0 | 1 |
FIG. 22
| INPUT | OUTPUT |
|---|---|
| ALL 0 | 1 |
| ALL 1 | 0 |
| 0 AND 1 | 0 |
FIG. 23
INVENTORS
Frederic L. Rieger
Jack I. Kern
William F. Utzinger
BY Wood, Herron & Evans
ATTORNEYS INVENTORS
Frederic L. Rieger
BY Jack I. Kelm
William F. Utzinger
Wood, Herron & Evans
ATTORNEYS Oct. 21, 1969 F. L. RIEGER ET AL 3,474,234

ENCODED TAG READER

Filed Oct. 3, 1967 11 Sheets-Sheet 10

INVENTORS
Frederic L. Rieger
BY Jack A. Kern
William F. Utzinger
Wood, Herron & Evans
ATTORNEYS

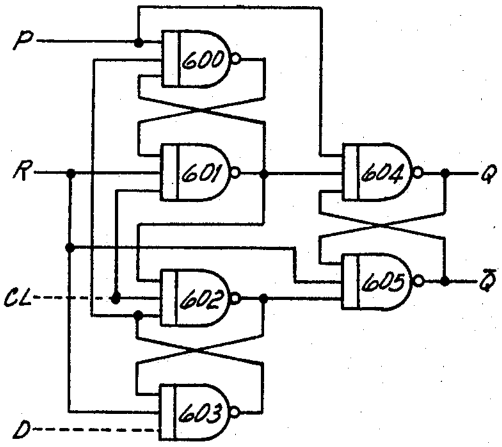
FIG. 25
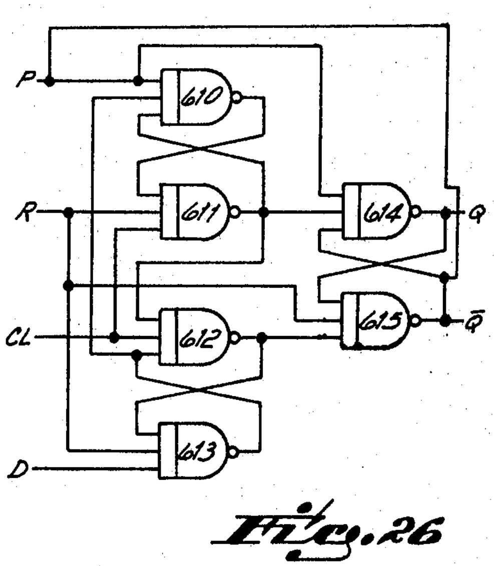
FIG. 26
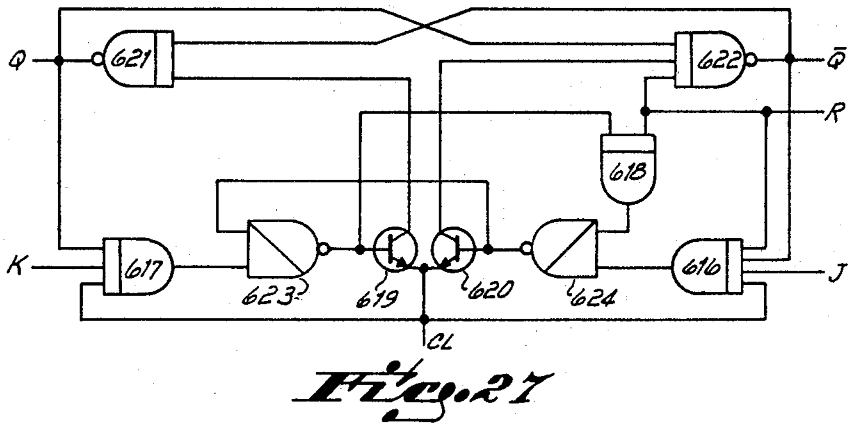
FIG. 27
| INPUTS | | | OUTPUT |
|---|---|---|---|
| CL | R | D | Q |
| 0 | | 1 | 1 |
| | 0 | | 0 |
FIG. 24
INVENTORS
Frederic L. Rieger
Jack S. Kern
William F. Utzinger
BY Wood, Herron & Evans
ATTORNEYS United States Patent Office 3,474,234
Patented Oct. 21, 1969

3,474,234
ENCODER TAG READER

Frederic L. Rieger, Dayton, Jack I. Kern, Kettering, and William F. Utzinger, Dayton, Ohio, assignors to The Monarch Marking System Company, Dayton, Ohio, a corporation of Ohio Filed Oct. 3, 1967, Ser. No. 672,629
Int. Cl. G06k 7/00; G01n 21/30
U.S. Cl. 235—61.11 11 Claims

ABSTRACT OF THE DISCLOSURE

Apparatus for reading a tag having a circular sensible data receiving region symmetric with an aligner formed in the tag and including encoded message and start data, the apparatus providing internal timing signal generating means responsive to detection of the start data and means for sequentially sensing the message data.

This invention relates to encoded tag reading apparatus and more particularly to apparatus for reading merchandise tags having circularly arranged photosensible information imprinted thereon.

Broadly illustrative of the general type of tag suitable for use with the reader of this invention are the tags disclosed and claimed in the copending applications of Paul H. Hamisch for Improved Machine Readable Merchandise Tag, S.N. 601,683, filed December 14, 1966, and of Herbert LaMers for Interpreting System, S.N. 260,748, filed February 25, 1963. In each of the above applications a tag is shown which embodies a construction fundamentally different from that employed in machine readable tags previously known in the art. Specifically, each tag disclosed is predicated on the concept of providing a central alignment hole in the tag about which machine readable information such as encoded price, description, inventory number, etc. is imprinted in the form of circularly arranged patterns of photosensible marks.

The merit of a tag having encoded information symmetrically disposed relative to an alignment hole is that the need for careful registration between the tag and reader during reading is virtually nonexistent. To secure alignment between the tag and reader, it is only necessary to insert a suitably positioned probe, which protrudes from the reader, into the hole in the tag. This automatically aligns tag scanning transducers located in the reader with the circular rings or patterns of encoded machine readable information imprinted on the tag. Precise angular orientation of the tag and the probe is unnecessary. Because of this ease of registration, tags of this type have come to represent a fundamental advance in the encoded machine readable tag field.

With the prior art tags, that is, those not having a central alignment hole, before readout of an encoded tag is possible, it is first necessary to carefully and painstakingly align the tag with the scanning transducers in the reader. This alignment problem is particularly aggravated in high volume operations as, for example, in supermarkets where encoded machine readable price tags are used to automate the check-out operation. In such a case, if careful tag alignment is a requisite to reading the price of, for example, 50–100 articles per customer, the check-out operation is productive of intolerable delays. Hence, such a machine readable tag impedes, not aids, the automation process.

Tags disclosed in the above-referenced copending applications having the combined alignment hole and symmetrically disposed information, while solving the alignment problem, have resulted in a tag format which does not permit an optimum reduction in tag size and cost. These tags have typically included timing data in addition to machine readable information marks in the nature of pricing data, inventory number, article description, etc. The timing data in one preferred form comprises a plurality of photosensible timing marks arranged in a circular pattern concentric with the circularly arranged encoded pricing, inventory, or descriptive data. In accordance with this arrangement there is one radially aligned timing mark for each information, inventory or pricing mark. In operation, the timing marks are sensed by the reader simultaneously with the encoded information or pricing marks. This provides a series of synchronous timing signals useful in processing the encoded information or pricing data contained on the tag.

As one skilled in the art will readily appreciate, the need for imprinting a circular pattern of timing marks on the tag necessarily increases the cost of the tag. This cost increase is manifested in at least two different respects. First, the cost of the tag stock necessary to produce such a tag is larger. If it is desired to encode a tag with sixty bits of codeable pricing or inventory data, a tag must be provided which is larger by at least the amount necessary to imprint a circular pattern containing sixty photosensible timing marks. The second aspect of the cost problem concerns the actual expense of imprinting the tag with the photosensible timing data. This requires a printing operation which involves the use of specialized equipment adapted to accurately print in a circular pattern, the cost of ink, etc. While the extra cost attributable to the need for imprinted timing data may, on a per tag basis, be relatively insignificant the total additional cost to a typical large scale user of, for example, twenty million tags per year, is not insignificant.

It has been, therefore, an objective of this invention to eliminate the need for imprinting timing data on tags of the general type described, thereby effecting a reduction in tag size, and hence in cost. This objective has been accomplished in accordance with the principles of this invention by providing a self-timed tag reader, that is, one which is capable of generating timing signals internally, thereby dispensing with the need for timing marks on the tag itself. More specifically, this objective has been achieved by providing a self-timed tag reader which includes a light source adapted to direct a beam of light on a timing transducer and a light beam interrupter selectively positionable in the beam path. The source, transducer and interrupter are relatively movably mounted for periodically interrupting the light beam in response to the tag scanning action of the reader, thereby causing the transducer to generate timing signals in synchronism with the scanning.

In one preferred embodiment of this invention, the light beam interrupter is in the form of a timing disc having a plurality of circularly arranged slots corresponding in number and spacing to the information bit positions on the tag. The slotted disc is adapted to rotate at a speed equal to the rotational speed of the transducer which scans the tag. In operation, when the scanning transducer senses the beginning of the encoded information, the timing disc begins rotating, causing periodic interruption of the light beam and the consequent generation of timing signals. The periodicity of the interruption, and hence of the timing signals, is equal to, and in synchronism with, the scanning rate of the information bits due to the number and spacing of the timing slots and the speed of the rotating timing disc. Thus, synchronously generated timing signals are produced without resort to external timing means such as the circular pattern of photosensible timing marks imprinted on the surface of the prior art tags.

Other objectives and advantages of this invention will be more readily apparent from a detailed description of the invention taken in conjunction with the accompanying drawings in which:

FIGURE 6A is an enlarged fragmentary cross-sectional view of the slip ring assembly portion of FIGURE 6.

FIGURE 18 is a cross-sectional view taken along line 18—18 of FIGURE 16.

Figure 19A:
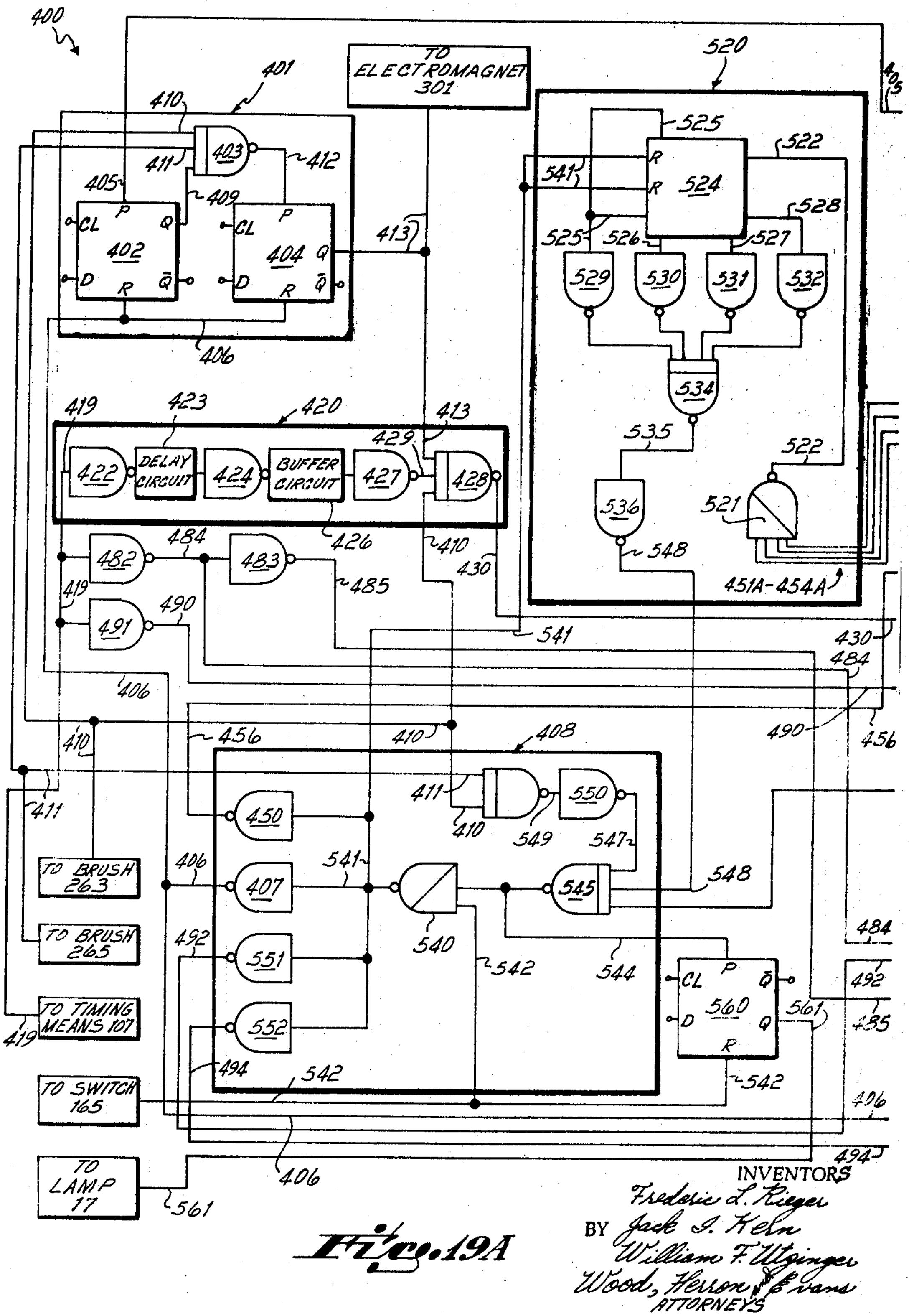
Figure 19B:
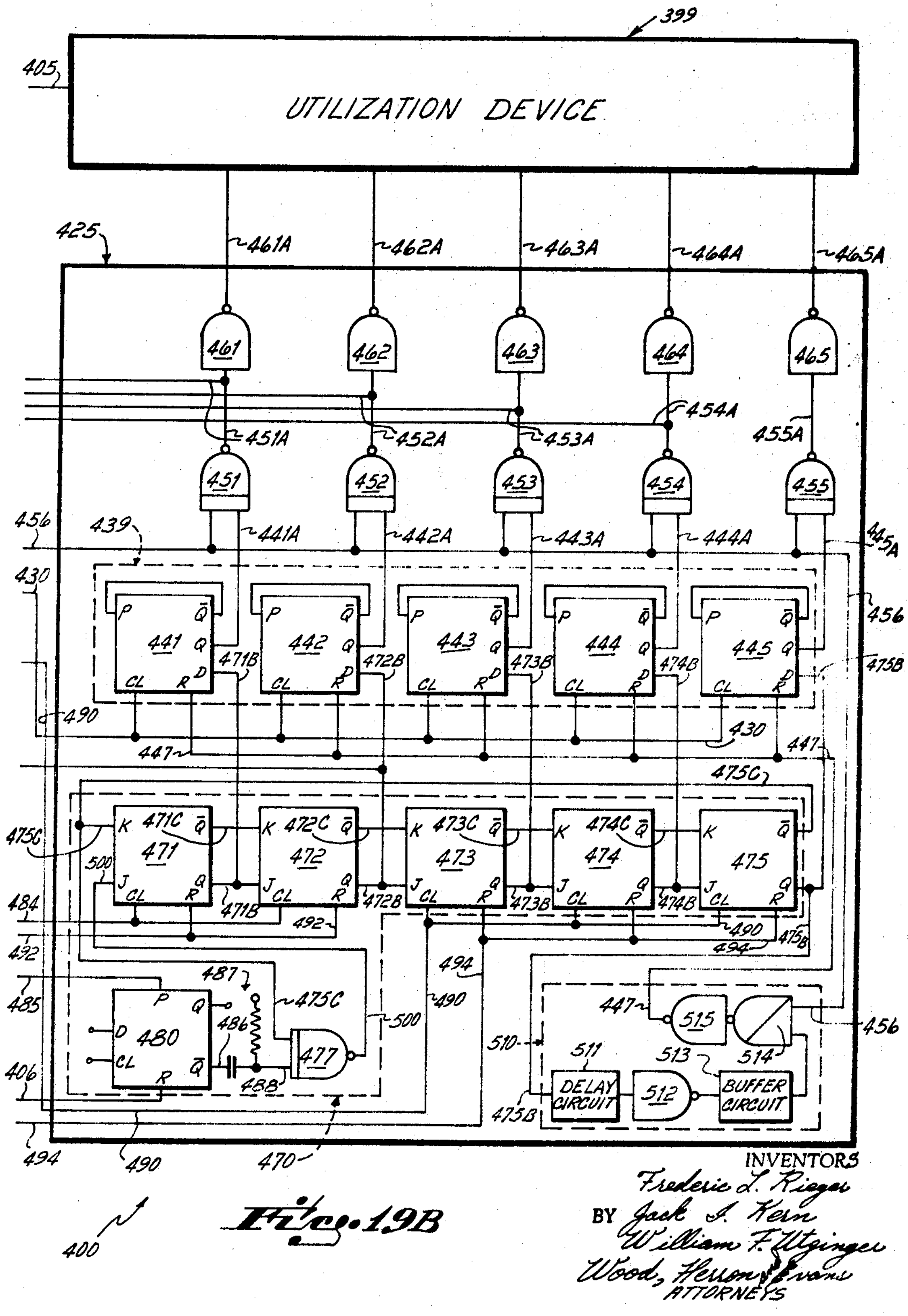

FIGURES 19A and 19B collectively are a schematic diagram of a logic circuit suitable for use with the reader of this invention.

FIGURES 20–24 are truth-tables for certain of the conventional logic blocks used in the logic circuit of FIGURES 19A and 19B.

FIGURE 25 is a functional block diagram of a preferred Flip-Flop circuit operating in accordance with the truth-table of FIGURE 20.

FIGURE 27 is a functional block diagram of a preferred Flip-Flop circuit operating in accordance with the truth-table of FIGURE 24.

FIGURE 26 is a functional block diagram of a preferred Flip-Flop circuit operating in accordance with the truth-table of FIGURE 22.

Figure 1:
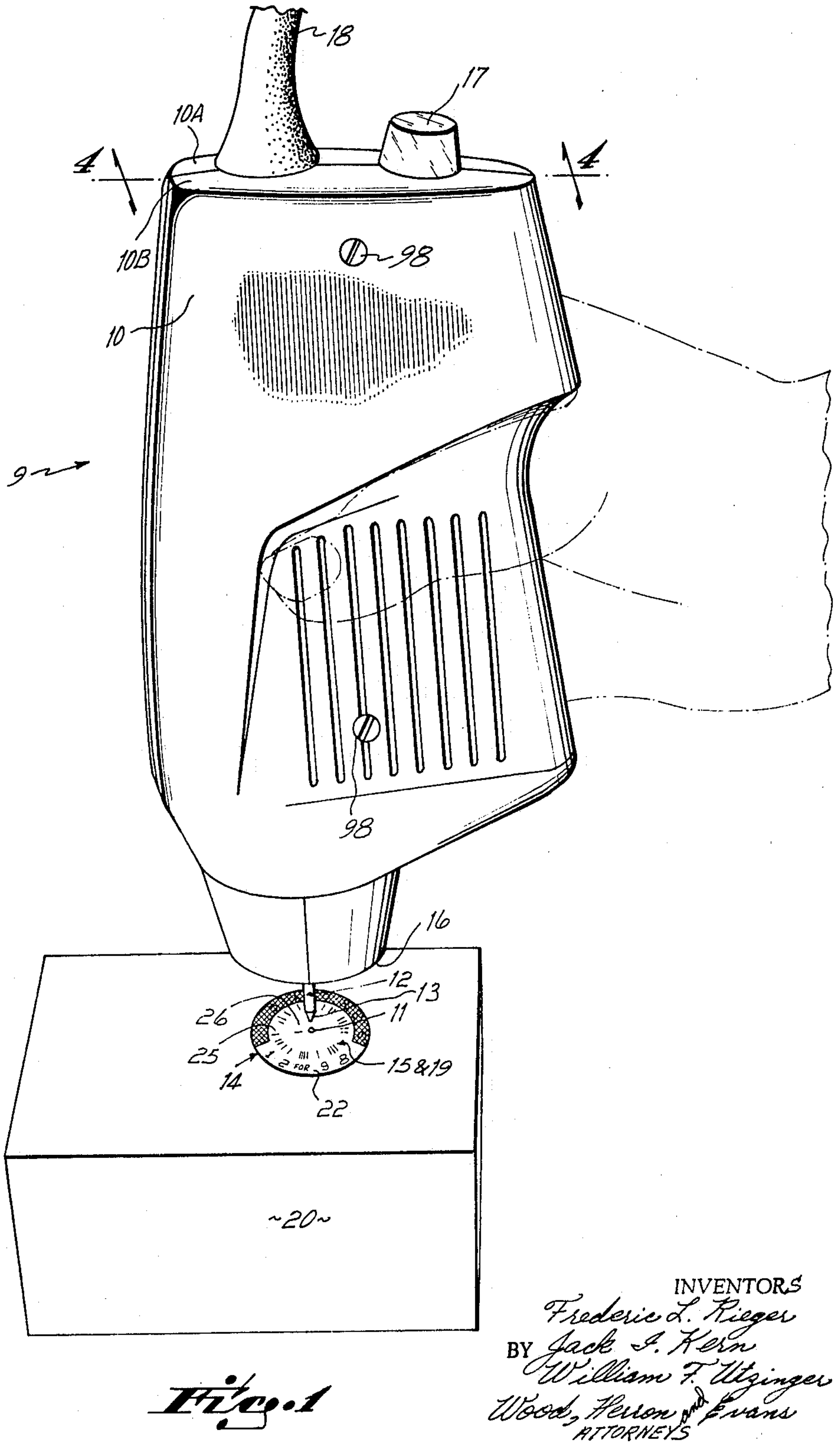
FIGURE 1 is a perspective view of one side of a preferred embodiment of the tag reader of this invention, showing its use in connection with reading a tag on an article of merchandise.

As shown in FIGURE 1, the preferred embodiment of this invention includes a tag reader 9 having a housing 10 which encloses the various operating components of the reader to be described in detail hereafter. The housing 10 is preferably formed in two complementary half-sections 10A and 10B, fabricated of cast aluminum to render it lightweight, and contoured to permit it to be comfortably grasped by the user's hand.

Projecting from the lower end of the housing 10 of the reader 9 is a retractable projection or probe 12. The lower end or tip 13 of the probe 12 is adapted to engage an aligner, such as a centrally disposed hole 11, formed in a tag 14 which is attached to merchandise 20, for example, articles on sale in a department store. Engagement of the tip 13 and hole 11 permits circularly arranged machine readable information 15, such as the price of the merchandise 20, imprinted on a surface 19 of the tag to automatically register with suitable scanning transducers (not shown in FIGURE 1) located within the lower portion of the housing 10 when the tag is positioned at a read station 16, that is, when the information-bearing surface 19 of the tag 14 and the lower face 16 of the housing are relatively moved into contact.

The upper end of the housing 10 has extending therefrom an indicating lamp 17. The lamp 17 is adapted to become illuminated when the reader 9 has completed reading a tag 14 properly positioned at the read station 16, thereby providing the operator with a visual indication that the tag reading cycle has been completed. The upper end of the housing 10 is further provided with an electrical cable 18 in which are positioned the necessary wires for providing power to the various operating components of the reader 9, as well as for permitting the information 15 read from the tag 14 to be output to a suitable utilization device, such as a cash register or centrally located data processing apparatus or computer.

In operation, the user grasps the contoured housing 10 of the reader 9 and inserts the tip 13 of the probe 12 in the central alignment hole 11 formed in the tag 14. The reader 9 and tag 14 are relatively moved toward each other, preferably by moving the reader downwardly toward the tag, urging the probe 12 inwardly and positioning the information-bearing surface 19 of the tag at the read station 16. With the tag 14 and reader 9 so oriented, the circularly arranged information 15 which is symmetrically disposed about the centrally positioned hole 11 is automatically properly registered with the transducers (not shown in FIGURE 1) contained in the reader. In addition, the probe 12 is retracted, This provides an input to the reader control or logic circuit (not shown in FIGURE 1) for the purpose of initiating circular scanning motion of the transducers, and thereby commencing the tag reading operation.

Upon completion of the tag reading operation, which occurs when the transducers have fully scanned the circularly arranged information 15, the lamp 17 becomes illuminated, visually advising the operator that the tag reading operation has been completed. The operator then removes the reader from the operative reading position with respect to the tag 14, preferably by lifting the housing 10 upwardly.

In addition to the indicating lamp 17 becoming illuminated upon completion of the tag reading operation, the information 15 which has been read by the reader 9 is output from the reader to the utilization device via the cable 18. If the utilization device is a cash register, upon completion of the tag reading cycle the information 15, which may for example include the price of the merchandise 20, is automatically entered into the cash register and the purchaser appropriately charged. Alternatively, if the cable 18 constitutes the input to a centrally located computer, upon completion of the tag reading operation the information 15, which may include both the price of the article and a description thereof, is automatically entered into the computer and the price of the article 20 charged to the purchaser's account as well as the inventory records updated to reflect the appropriate reduction in inventory represented by the purchase.

Figures 2, 3:
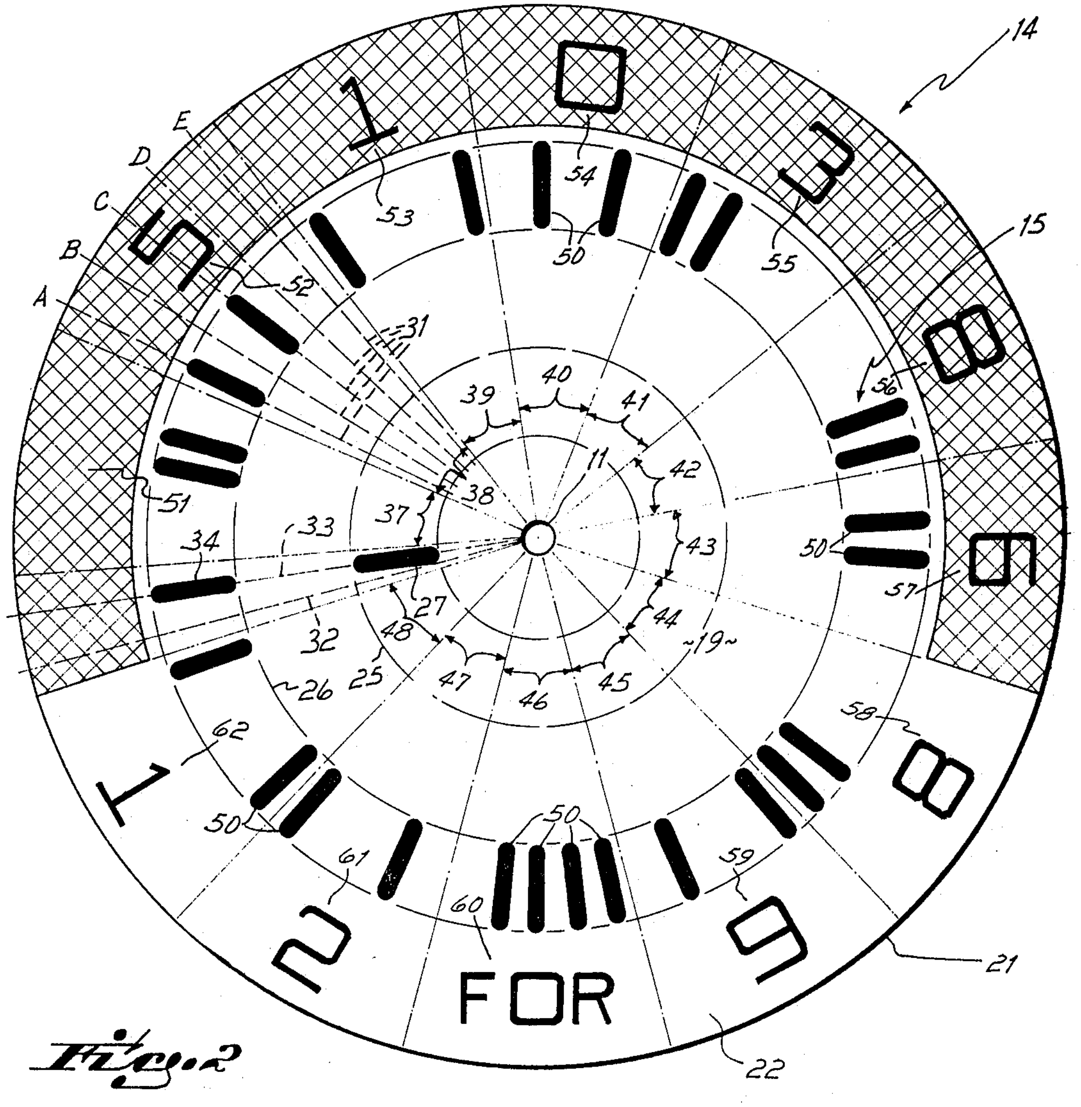
FIGURE 2 is one form of machine readable tag capable of use with the reader of this invention.
FIGURE 3 is a preferred coding chart suitable for use in encoding a tag.

Considering in more detail a preferred form of tag 14 suitable for use with the reader 9 of this invention, reference is made to FIGURE 2. Referring to this figure, tag 14 is shown to include a circular sheet of printing stock 21 constituting the body of the tag. The printing stock 21 is preferably constituted of paper, although other materials may be used, such as light gauge metals or foils, wood strips, plastic sheets and the like. The printing stock 21 is provided with the information-bearing surface 19 which is adapted to receive an imprint of the machine-readable information 15 and, if desired, a humanly intelligible translation 22 of the machine-readable information. Preferably, the information-bearing surface 19 is integral with the print stock 21, although it is contemplated that the information-bearing surface 19 may comprise, for example, a thin piece of paper laminated or adhered to a suitable support material or substrate such as wood, plastic, metal and the like, the paper and substrate in combination comprising the tag. Alternatively, the information-bearing surface 19 may comprise a print receptive surface on the merchandise itself or on a package in which the merchandise is contained.

The humanly intelligible translation 22 may be omitted under certain conditions. For example, if it becomes necessary to reduce the size of the tag to a minimum, the translation may be omitted and the size of the tag reduced accordingly. Typically, a tag such as that shown in FIGURE 2 which includes the translation 22 is approximately one and one-half inches in diameter.

Also included in the preferred embodiment of the tag 14 is the aligner 11, which preferably is a through hole, although it may be in the form of a blind hole, depression or dimple which does not extend entirely through the print stock 21. The function of the hole 11 is to engage the tip 13 of the projecting probe 12 for the purpose of automatically registering the circularly arranged machine-readable information 15 with the transducers of the reader 9 when the tag 14 is at the read station 16.

The machine-readable information 15 includes an inner ring 25 containing a start mark or bit 27 and an outer information ring 26. The information ring 26 is divided into sixty-two equally circumferentially spaced and contiguous information bit positions 31, each of which is adapted to receive a photosensible mark 50. Of the sixty-two information bit positions 31, one is left blank and one is used in combination with start mark 27 to control the reader. Specifically, information bit position 32 is left blank and information bit position 33, which is aligned with the start mark or bit 27, provided with a photosensible mark 34. Information bit position 32 is left blank merely because its use is unnecessary in an information format having twelve characters, each with five information bits, to be described. The photosensible mark 34 in combination with the start mark 27 establishes a reference for the beginning of the information 15, and when sensed by the transducers of the reader 9, initiate the reading operation. The remaining sixty information marks of ring 26 are divided into twelve contiguous character groups 37–48 each having five information bit positions A–E.

The character groups 37–48 are encoded by placing photosensible marks 51 in the various information bit positions 31 as dictated by the particular code being used. Preferably, the character coding scheme depicted in FIGURE 3 is utilized. In the preferred coding scheme depicted in FIGURE 3, the information bit positions 31 have positionable significance in the sense that the positions A–E of each character group 37–48 are weighted. Specifically, the first bit position A of each character group 37–48 is assigned a value of 1, the second bit position B of each character group is assigned a value of 2, the third bit position C of each character group is assigned a value of 4 the fourth bit position D of each character group is assigned a value of 8, and the fifth bit position E of each character group is assigned a value of 0, the fifth position being a check position.

If, for example, it is desired to encode a character group with the number 1, a photosensible mark 50 is placed in bit position A and bit position E. Similarly, if a character group is to be encoded with the number 2, a mark 50 is placed in the second position B and the fifth bit position E. In any given character group the value of the number encoded is equal to the sum of the values associated with those bit positions in which marks are placed except for the number 0 which is encoded by placing a mark in bit positions B and D and except for the numbers 11–15 which have other than numerical significance. Illustrative of such non-numerical code significance is character group 46 in which the photosensible marks correspond to the word "FOR," and the character group 37 in which the marks correspond to the words "START MESSAGE."

As those skilled in the art will understand, it is not necessary that all of the twelve character groups 37–48 be encoded. Nor is it necessary that the character groups be encoded in accordance with the code depicted in FIGURE 3. It is contemplated that other coding arrangements may be used such as conventional binary wherein the bit positions A, B, C, D and E of each code group correspond to the weighted binary values 1, 2, 4, 8 and 16, respectively. Further, is is not necessary that the encoding be numerical. Alphabetical or alpha-numerical coding may be used, as well as symbolism. It is also not necessary that the sixty bit positions of information ring 26 having encoded data be divided into twelve five-bit characters. Other character groupings are possible, such as fifteen four-bit characters, ten six-bit characters, etc.

The humanly intelligible translation 22 of coded information in ring 26 is divided into twelve juxtaposed character positions 51–62 corresponding to the twelve character groups 37–48 of the information ring. Assuming the number 510386, an inventory number identifying a merchandise item, is encoded in the character groups 38–43, the character positions 52–57 contain, as shown in FIGURE 2, the humanly intelligible Arabic numerals "5," "1," "0," "3," "8" and "6." Likewise, if the character positions 48–44 are encoded with the information "12 FOR 98," which may for example indicate the price of the merchandise, the character positions 62–58, respectively, will bear the humanly intelligible Arabic numerals "1" and "2," the word "FOR," and the Arabic numerals "9" and "8."

Considered in more detail, the reader 9, which is shown more particularly in FIGURES 4, 5, 6 and 6A, includes the housing 10 enclosing a stationary frame or support 99 and a generally symmetrical scanning assembly 100. The assembly 100 is disposed coaxially relative to the probe 12 and is mounted in frame-supported ball bearings 101 and 102 for rotation by a stationarily mounted drive means 103. The scanning assembly 100 carries in its lower end suitable phototransducing means, to be described. The phototransducing means move in circular scanning paths in registration with the information ring 26 and the ring 25 containing the start mark 27 of a tag 14 properly positioned at the read station 16, that is, with its information-bearing surface 19 in contact with a stationarily mounted transparent annular window 105. Associated with the upper portion of the scanning assembly 100 is timing means 107 which, in a manner also to be described, generates timing pulses in synchronism with the sensing of the photosensible mark receiving bit positions 31 of the information ring 26.

The frame or support 99, which is secured to the housing 10 by fasteners 98, is a uniquely configured casting having a plurality of suitably positioned locating surfaces for supporting and positioning the various components of the reader in operative relationship with each other. The frame 99, more specifically, includes a semicircular upper yoke or saddle 110, shown best in FIGURES 4 and 5. A semicircular clamp 111 secured to the saddle 110 by suitable fasteners 112 locates and clamps the bearing 101 in a position suitable for rotatably supporting the upper portion of the scanning assembly 100. The support 99 further includes a lower yoke or saddle 114 which, like the saddle 110, is semicircular in configuration. Cooperating with the saddle 114 and secured thereto by fasteners 117 is a semicircular clamp 115 which locates and secures the bearing 102 in a position to rotatably support the lower portion of the scanning assembly 100. The frame 99 further includes a horizontally extending shelf portion 118 which is adapted to mount the drive means 103, and a vertical arm 120 from which extend horizontal shelf members 121 and 122 which mount the printed logic circuit 400 of FIGURES 19A and 19B to be described.

Figure 4:
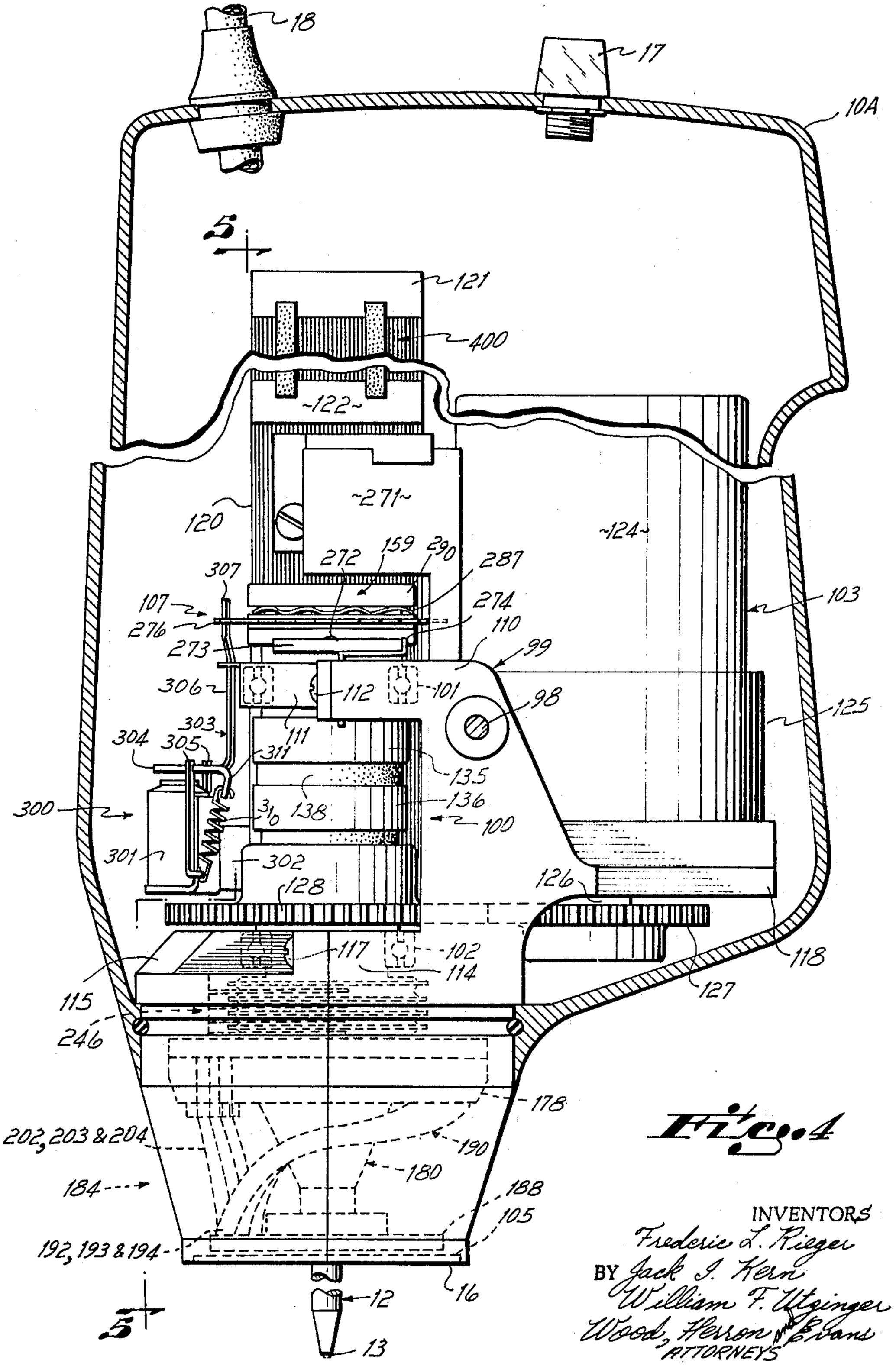
FIGURE 4 is a cross-sectional view taken along line 4—4 of FIGURE 1 showing the general relationship of the principal components of the tag reader of this invention.

The drive means 103 for rotating the scanning assembly 100 includes, as shown in FIGURE 4, an electrical motor 124 and a speed reduction unit 125. The motor 124 has an output shaft (not shown) which is input to the speed reduction unit 125 for providing on output shaft 126 low speed rotary motion, for example, 200 revolutions per minute, for transmission to a drive gear 127. Meshed wih drive gear 127 is a driven gear 128 secured to the scanning assembly 100 for imparting rotary motion to the latter in response to energization of the motor 124.

Figures 6, 10, 11, 12:
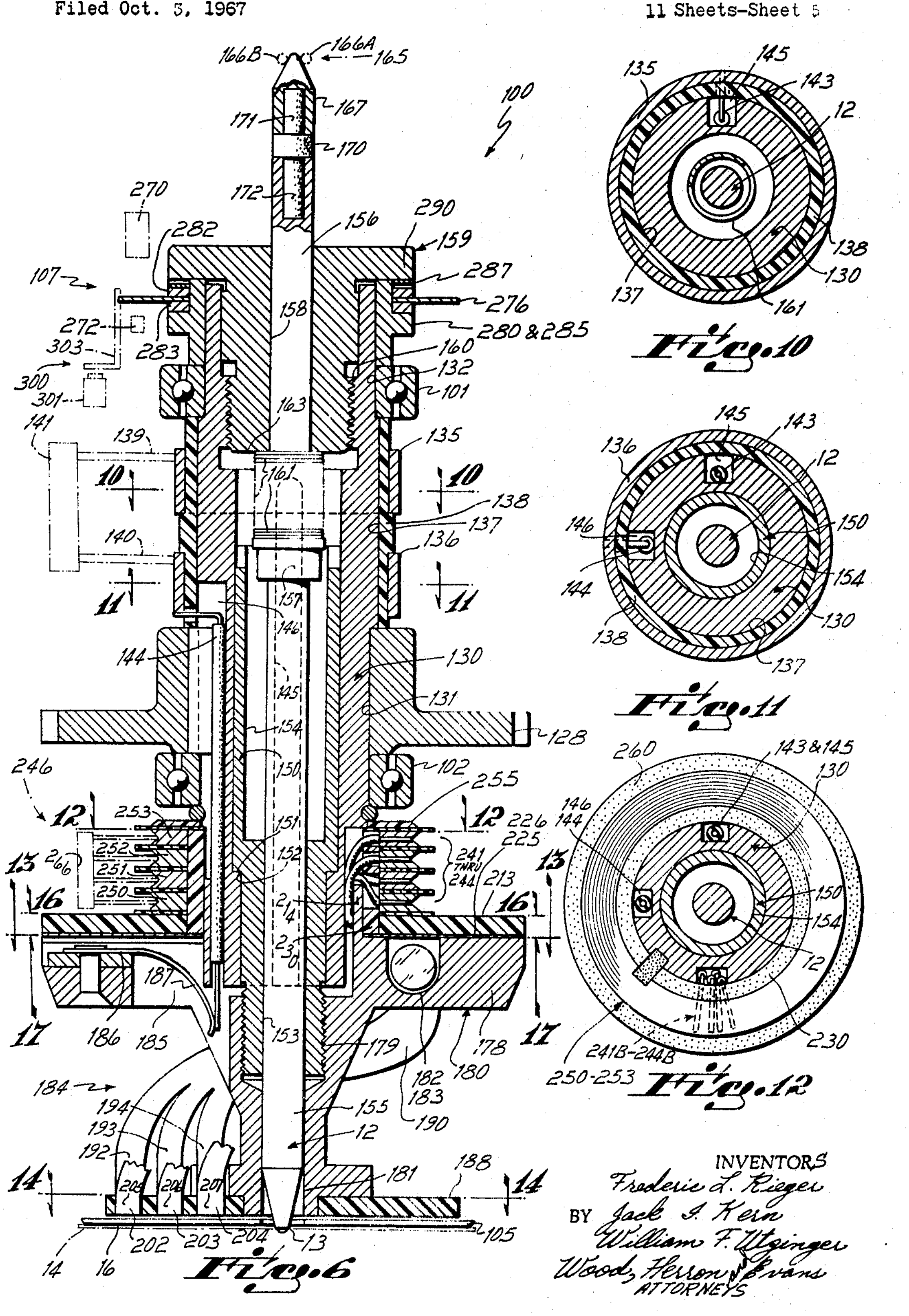
FIGURE 6 is a cross-sectional view taken along line 6—6 of FIGURE 5.
FIGURE 10 is a cross-sectional view taken along line 10—10 of FIGURE 6.
FIGURE 11 is a cross-sectional view taken along line 11—11 of FIGURE 6.
FIGURE 12 is a cross-sectional view taken along line 12—12 of FIGURE 6.

The scanning assembly 100 considered in more detail includes, as shown particularly in FIGURE 6, a generally hollow cylindrical sleeve 130 having stepped outside diameter surfaces 131 and 132. The sleeve 130 is mounted for rotation with the inner races of the ball bearings 101 and 102 in response to rotation of the driven gear 128 which is suitably keyed to the surface 131 of the sleeve 130. An end cap 159 having a central bore 158 is threaded in the upper end 160 of the sleeve 130.

A pair of slip rings 135 and 136, as shown in FIGURE 6, are positioned about the sleeve 130 and separated from each other and from the sleeve surface 137 by a suitably configured insulating spacer 138 which is secured to the sleeve surface 137. The slip rings 135 and 136 cooperate with the free ends of suitably disposed stationary leaf spring contacts 139 and 140, the other ends of which are secured in a stationary insulative support 141 mounted to the vertical arm 120 by fastener 142 (see FIGURE 5). Electrically connected to the slip rings 135 and 136 are wires 143 and 144, respectively, which extend downwardly in vertical slots 145 and 146, respectively, formed in the periphery of the sleeve 130 for ultimate connection to illuminating means for irradiating the surface 19 of a tag 14 located at the read station 16 in a manner to be described. The contacts 139 and 140, in addition to being in electrical contact with the slip rings 135 and 136, are also electrically connected to the logic circuit 400 by suitable wires (not shown) enabling power to be transmitted to the illumination means.

A stepped outside diameter inner sleeve 150, as shown in FIGURE 6, is positioned within the hollow sleeve 130. The sleeve 150 has an external shoulder 151 which cooperates with an internal shoulder 152 formed on the sleeve 130 for properly locating the sleeves 130 and 150 with respect to each other. The sleeve 150 further includes a small diameter lower bore 153 and a large diameter upper bore 154.

As depicted in FIGURE 6, the probe 12, in addition to the tip 13, includes a lower shaft portion 155 and an upper shaft portion 156 separated by a larger diameter portion or collar 157 and a conical conductive tip 167. The lower shaft portion 155 of the probe 12 is located by, and axially shiftable within, the small diameter bore 153 of the sleeve 150. The upper shaft portion 156 of probe 12 is located by, and axially shiftable within, the bore 158 of the end cap 159. A compression spring 161 is placed about the upper shaft portion 156 of the probe 12 between the end surface 163 of cap 159 and the collar 157 for biasing the probe 12 downwardly to the position shown in FIGURE 5.

Cooperating with the conical tip 167 of the probe 12 is a switch 165 mounted to the arm 120 of frame 99. The switch 165 has horizontally extending spaced parallel spring wire contacts 166A and 166B adapted to be electrically bridged (see FIGURE 9) by the conductive conical tip 167 when the probe 12 is in its retracted position, as shown in FIGURE 6, which occurs when a tag 14 is located at the read station 16. The switch 165 is suitably electrically connected in circuit with the motor 124 and contacts 139 and 140 for energizing the motor 124 and lamp 183 when the probe 12 is retracted. The switch 165 is also connected to the logic circuit 400 for providing an electrical signal when the probe position is changed from a retracted position to an extended position, for reasons to be described.

The conical conductive tip 167 is preferably electrically insulated from the upper shaft portion 156 by a suitably configured insulative spacer 170. The spacer 170, as shown best in FIGURE 6, has upper and lower stems 171 and 172 which fits in axial blind holes formed in the conical tip 167 and upper shaft portion 156, respectively. Electrically insulating the conical tip 167 from the remainder of the probe 12 eliminates the risk that bridging of the contacts 166A and 166B by the conductive tip 167 results in electrical shocks to the operator.

Figures 13, 14, 15:
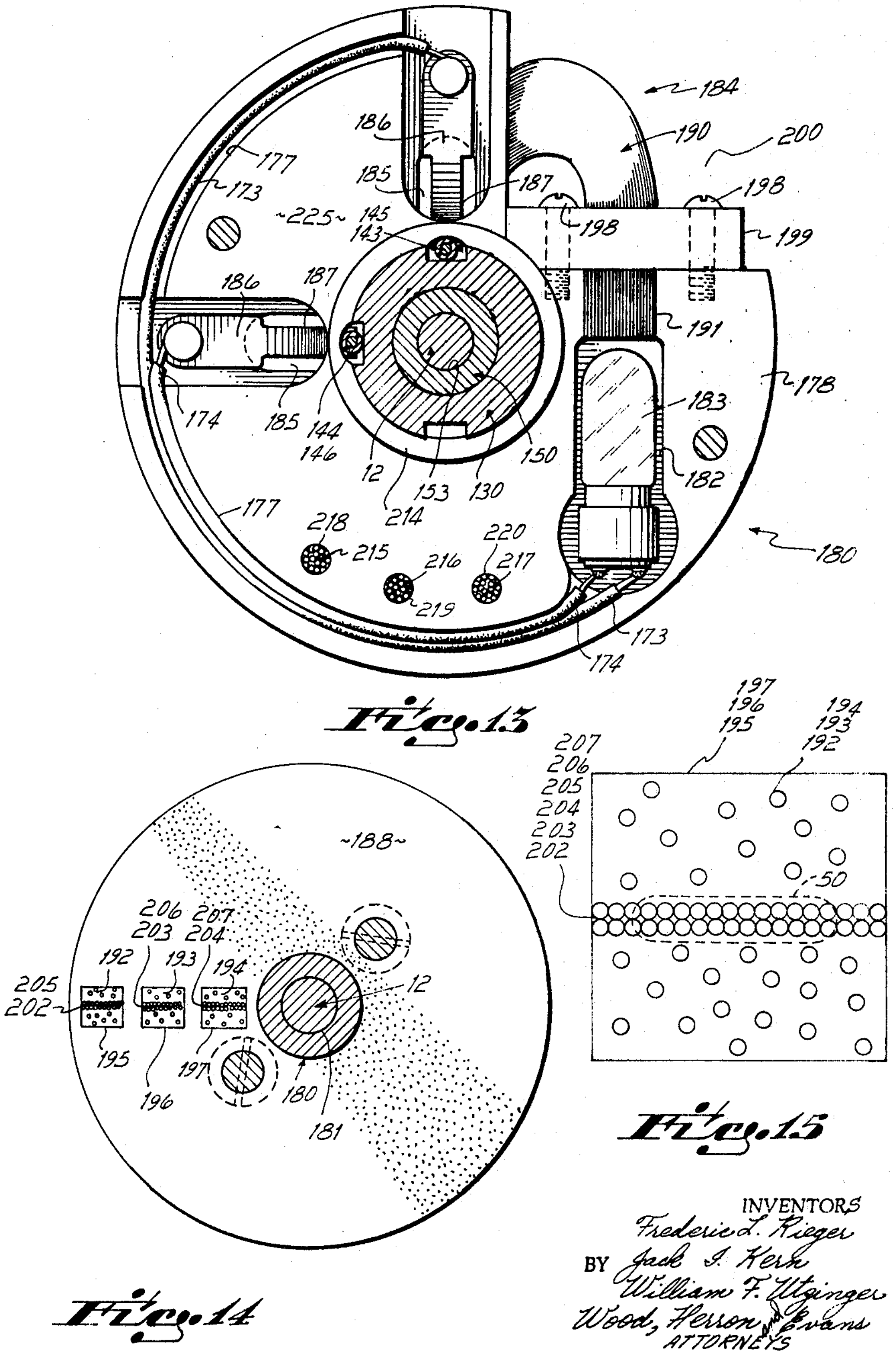
FIGURE 13 is a cross-sectional view taken along line 13—13 of FIGURE 6.
FIGURE 14 is a cross-sectional view taken along line 14—14 of FIGURE 6.
FIGURE 15 is an enlarged plan view of a scanning aperture showing the relationship of the illuminating and sensing optical fibers.

The transducing section of the reader 9 which is contained in the lower portion of the scanning assembly 100 includes a mounting block 180. The block 180, as shown in FIGURES 6 and 13, has a small diameter bore 181 within which the lower portion 155 of the probe 12 is located and axially shiftable, and a large diameter bore 179 within which is threaded the lower portion of the sleeve 150 for locating the block 180 in its operative position. Formed in the upper surface 225 of a radially extending portion 178 of the block 180 is a cavity 182. The lamp 183 is placed in the cavity 182 and functions as a source of illumination for irradiating the information-bearing surface 19 of the tag 14 via a fiber optic means 184 to be described. Within a substantially semicircular groove 177, also formed in the upper surface 225 of the radial portion 178 and connected with the cavity 182 are a pair of wire conductors 173 and 174 which interconnect the lamp 183 and the slip ring connectors 143 and 144, respectively, for providing the lamp with the necessary electrical power. The wires 173 and 174 are connected to a leaf spring conductor 186 having a flexible arm 187 depending from the top surface 225 through a slot 185. The arm 187 is engageable with the lower ends of wires 143 and 144 to complete the energization circuit from the slip rings 135 and 136 to the lamp 183.

The fiber optic means 184 include a set of illuminating optical fibers 190 which transmit light from the lamp 183 to the information-bearing surface 19 of a tag 14 properly located at the read station 16. The illuminating optical fibers 190 at their upper end 191 are grouped together and terminate at the cavity 182 adjacent the lamp 183. A clamp 199, which is positioned in a removed portion 200 of the radial flange 178, is secured to the flange by fasteners 198 and clamps the upper end 191 of the fiber optic group 190 in operative position with respect to the lamp 183. The illuminating optical fibers 190 at their lower ends are divided into three separate groups, 192, 193 and 194. The groups 192–194 terminate in radially disposed scanning apertures 195, 196 and 197 (see FIGURE 14) formed in a disk 188 positioned at the read station 16. The disk 188 is secured to the lower extremity of the block 180 parallel to the transparent window 105.

The scanning apertures 195 and 197 are radially positioned with respect to the probe 12 such that when a tag 14 is properly aligned and positioned at the read station 16, optical fiber groups 192 and 194 illuminate the information ring 26 and the ring 25 containing the start mark 27, respectively. The aperture 196 is positioned with respect to the probe 12 such that the intermediate optical fiber group 193 illuminates the annular portion of the information-bearing surface 19 of a tag 14 located between the ring 25 and the information ring 26.

The fiber optical means 184 also include three groups of sensing optical fibers 202, 203 and 204. Optical fiber groups 202–204 are provided for transmitting to the phototransducers to be described light reflected from the information ring 26, the optional information ring positioned intermediate the information ring 26 and the start mark 27, and the ring 25, respectively. The sensing optical fiber groups 202, 203 and 204 have their lower ends 205, 206 and 207, respectively, terminated in scanning apertures 195, 196 and 197, respectively, for receiving light reflected from their associated rings formed on the information-bearing surface 19 of a tag 14 properly positioned at a read station 16.

Referring to FIGURE 15, the relationship of the ends

205–207 of the sensing optical fibers 202–204 and the groups 192, 193 and 194 of the illuminating optical fiber group 190 is depicted. Specifically, the ends 205, 206 and 207 of the sensing optical fiber groups 202, 203 and 204, respectively, are arranged in apertures 195–197, respectively, in parallel rows disposed radially with respect to the probe 12, the width of the rows preferably being less than the width of a mark 50. With the ends 205, 206 and 207 of the optical fiber groups 202, 203 and 204 so arranged, a photosensible mark 50 (shown in phantom) placed on the information-bearing surface 19 of the tag 14 will, at some point in the scanning cycle, become aligned with the ends of the sensing optical fibers enabling the light reflected therefrom to be transmitted to the transducers. The ends of the optical fibers of illuminating groups 192–194 terminated in apertures 195–197 in surrounding relationship to the ends 205–207 of sensing groups 202–204, directing an illumination beam toward the information-bearing surface 19 of a tag 14 which is large in comparison with the size of a mark 50.

The upper ends 215, 216 and 217 of the sensing fiber optic groups 202, 203 and 204 terminate in apertures 218, 219 and 220 (see FIGURES 13 and 18) formed in the horizontal portion 178 of the block 180. Disposed opposite the apertures 218, 219 and 220 are phototransducers 210, 211 and 212 mounted in apertures 221, 222 and 223 formed in an insulating disk 213. The phototransducers 210–212 may be of any suitable type. Phototransducers of the photoconductive type manufactured by Texas Instruments, Incorporated, and designated Model No. LS-600 have been found to be satisfactory. The disk 213 is separated from the upper surface 225 of the portion 181 of block 180 by a cover plate 226, and is separated from a circular flange 214 extending vertically from the block 180 by an insulating collar 230.

Figure 16:
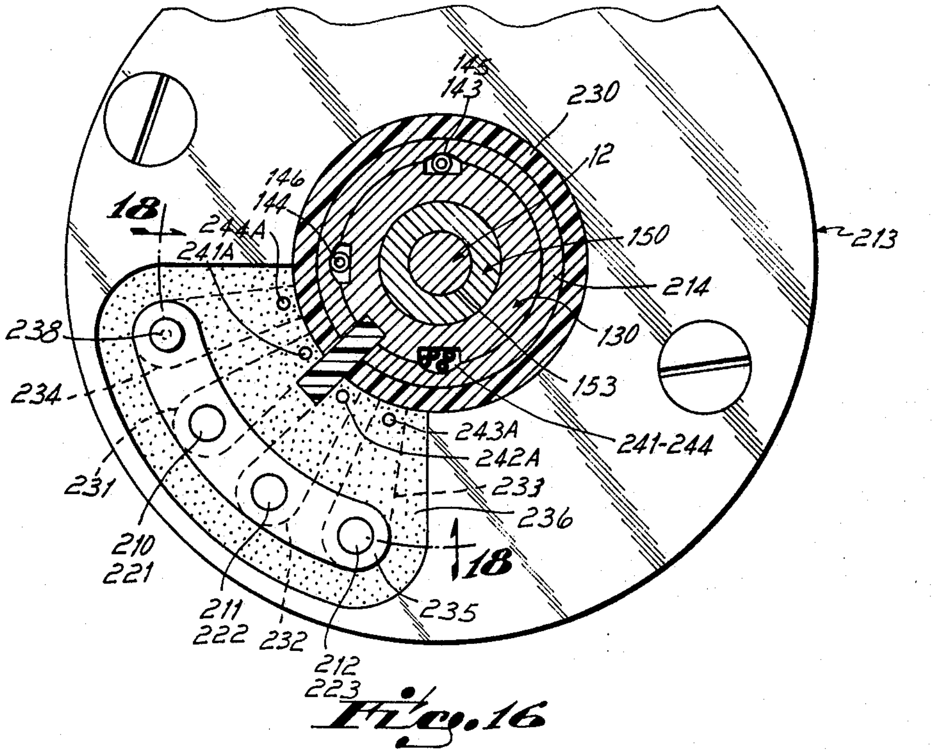
FIGURE 16 is a cross-sectional view taken along line 16—16 of FIGURE 6.
Figure 17:
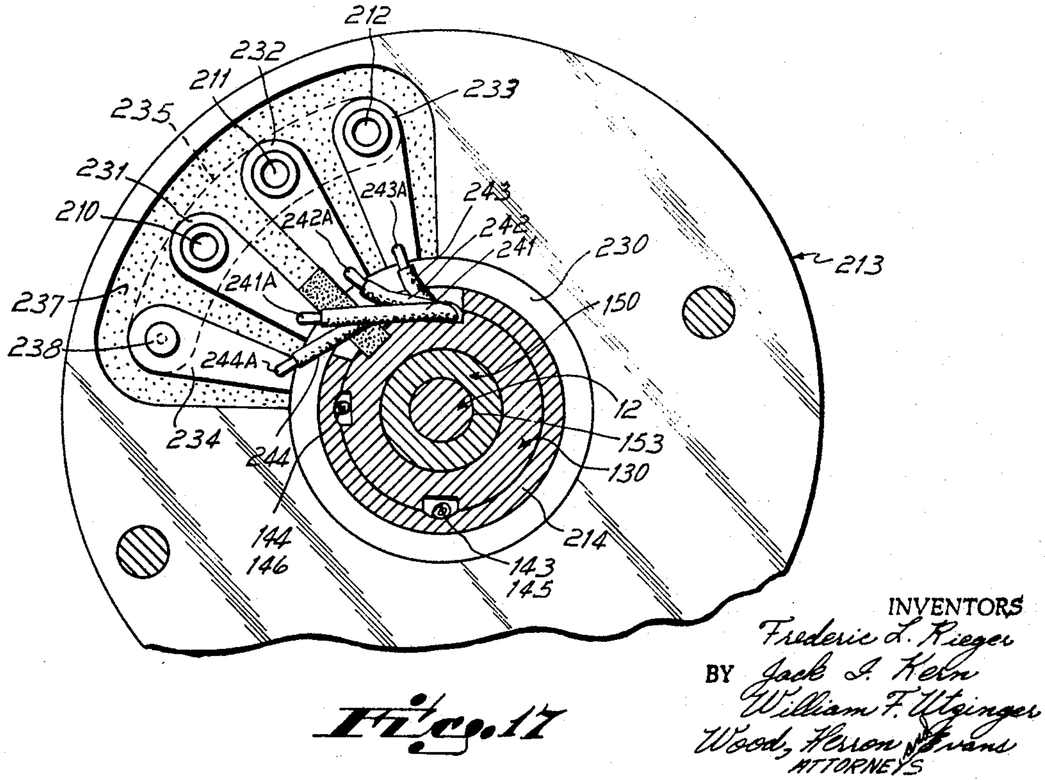
FIGURE 17 is a cross-sectional view taken along line 17—17 of FIGURE 6.

As shown in FIGURES 16–18, electrical connections to the phototransducers 210, 211 and 212 are preferably provided by printed circuit electrodes 231, 232, 233 and 234 formed on the underneath surface 237 of the insulative disk 213 and a printed circuit electrode 235 formed on the upper surface 236 of the disk. Print circuit electrodes 231–233 are connected to one of two terminals of phototransducers 210–212, respectively, while electrodes 234 and 235, interconnected via a plated through hole 238, are connected in common to each of the other of the two terminals of the phototransducers 210–212.

Interconnection to the logic circuit 400 of the electrode 234 and of the electrodes 231–233 is accomplished by means of electrical wires 244, 241, 242 and 243 and a slip ring and brush assembly 246. The wires 244 and 241–243 have their lower ends 244A and 241A–243A connected to the electrodes 234 and 231–233, respectively, and their upper ends 244B and 241B–243B connected to conductive slip rings 250 and 251–253, respectively. The conductive rings 250 and 251–253 are insulated from each other and from the disk 213 and an annular spacer 255 positioned about the sleeve 130 and by annular insulative disks 256, 257, 258, 259 and 260 (see FIGURE 6A). Cooperating with the conductive rings 250, 251, 252 and 253 are the free ends of conductive wire brushes 262, 263, 264 and 265 whose opposite ends are secured in an insulative brush holder 266 stationarily mounted to the frame 99. The brushes 262–265 are connected, in a manner to be described, to the logic circuit 400 depicted in FIGURES 19A and 19B for transmitting signals between the transducers 210–212 and the logic circuit.

Three illuminating fiber optic groups 192–194, which includes the optional group 193, three sensing fiber optic groups 202–204 including an optional group 203, and three phototransducers 210–212 including an optional phototransducer 211 are provided in the event that it is desired to provide an optional information ring on the information-bearing surface 19 of the tag 14 intermediate rings 25 and 26. Should only a single information ring 26 be provided on the tag, as is the case with the tag 14 depicted in FIGURE 2, the optional illuminating and sensing groups of optical fibers 193 and 203, and the optional phototransducers 211 and associated circuitry including the electrical wire 242, slip ring 252 and brush 264 may be eliminated.

The timing means 107 for generating timing signals in synchronism with the sensing of the circularly arranged photosensible mark receiving positions 31 and the start mark 27, which is depicted more particularly in FIGURES 4–8, includes a source of light or lamp 270 stationarily mounted to the saddle 110 of frame 99 by a bracket 271 and a phototransducer 272 stationarily mounted on an insulative support 273 secured to the stationary saddle 110 of frame 99 by a bracket 274. The transducer 272 preferably is of the same type as transducers 210–212, although others may be used if desired. The lamp 270 and the phototransducer 272 are disposed such that a beam of light 275 emanating from the lamp 270 is directed toward the phototransducer 272.

Figures 5, 7, 8, 9:
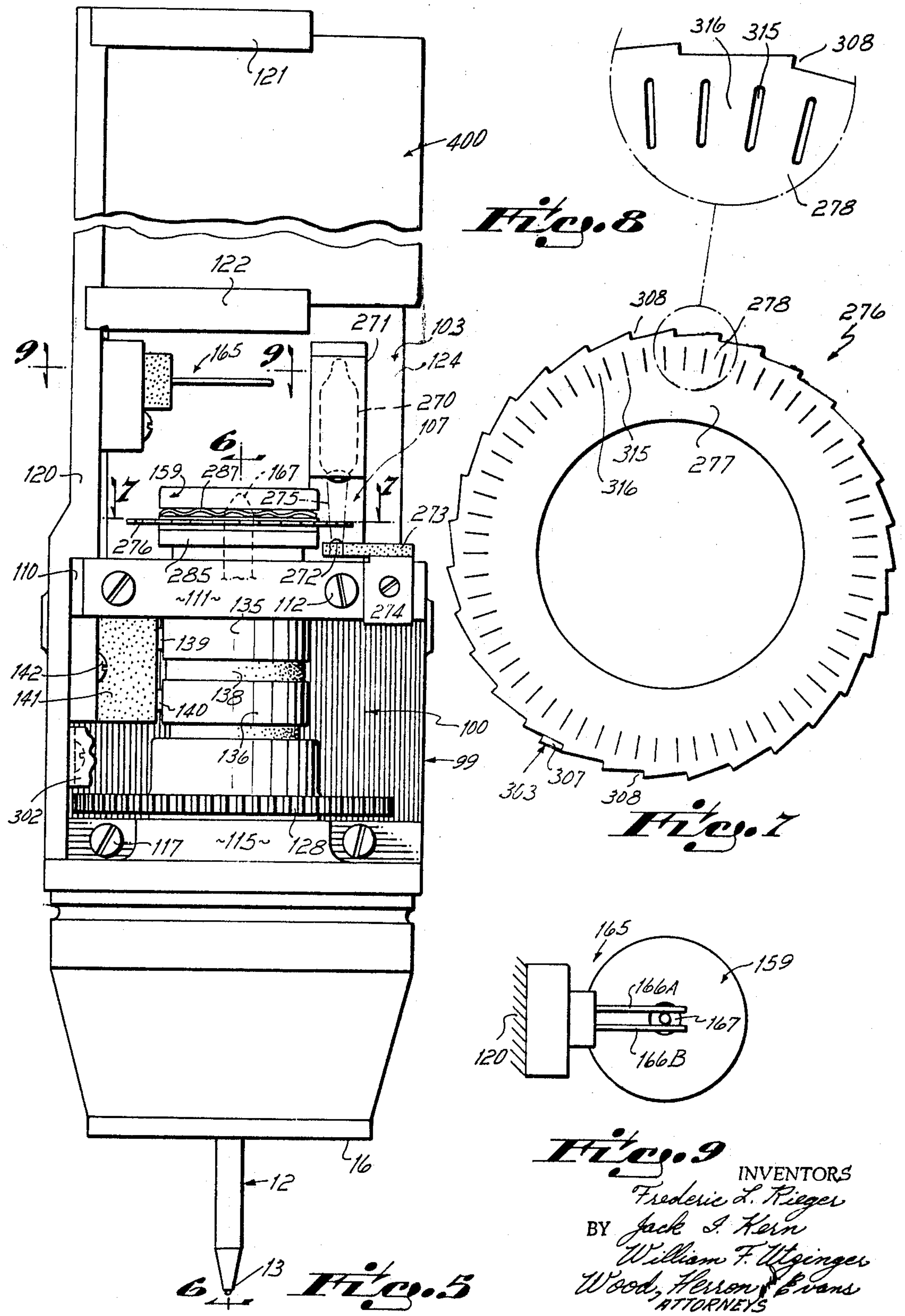
FIGURE 5 is a cross-sectional view taken along line 5—5 of FIGURE 4.
FIGURE 7 is a cross-sectional view of the timing disc taken along line 7—7 of FIGURE 5.
FIGURE 8 is an enlarged plan view of a portion of the timing disc of FIGURE 7, showing the relationship of the peripheral teeth and slots.
FIGURE 9 is a cross-sectional view taken along line 9—9 of FIGURE 5.

The timing means 107 further includes a light beam interrupter 276 shown more particularly in FIGURES 7 and 8. The interrupter 276 is preferably annular, having an inner marginal portion 277 and an outer marginal portion 278. The interrupter 276 is rotatably mounted on a spacer 280 secured to the surface 132 of upper end 160 of sleeve 130, and is positioned between a pair of annular friction disks 282 and 283 supported by an external flange 285 formed on the periphery of the spacer 280. A spring 287 is positioned between the upper frictional disk 282 and the radially extending portion 290 of end cap 159, and functions to urge the friction disks 282 and 283 together, sandwiching the inner marginal portion 277 of the timing disk 276 between the friction disks, for engaging the timing disk and friction disks, thereby permitting the timing disk to selectvely rotate with the scanning assembly 100 under circumstances to be described.

A selectively operable braking means 300 is provided to selectively restrain movement of the timing disk 276. The braking means 300 includes an electromagnet 301 secured to the arm 120 of the frame 199 by a bracket 302. The electromagnet 301 includes an armature 303 having a horizontally extending portion 304 pivotally mounted between stationary upstanding arms 305, and a vertically extending portion 306 having an upper free end 307 adapted to selectively engage teeth 308 formed in the outer periphery of the timing disk 276. The armature 303 is normally pivoted in the clockwise direction, as viewed in FIGURE 4, by a spring 310 connected between a depending arm 311 of the armature and the lower portion of one of the arms 305. With the armature 303 pivoted clockwise, the free end 307 of the arm 306 is urged against the periphery of the timing disk 276 into one of the teeth 308, preventing rotation of the timing disk 276.

Pivotal motion of armature 303 in the counterclockwise direction, as viewed in FIGURE 4, to disengage the free end 307 of the armature and the toothed periphery of the timing disk 276 is effected by energization of the electromagnet 301. Such energization draws the horizontally extending arm 304 of the armature 303 toward the upper end of the electromagnet 301, allowing the arm 304 to pivot counterclockwise, overcoming the bias of spring 310. This disengages the free end 307 of armature 303 from the teeth 308, allowing the timing disk 276 to rotate with the scanning assembly 100 under the combined action of spring-biased friction disks 282 and 283.

The outer marginal portion 278 of the timing disk 276 is provided with a plurality of light transmitting slots or apertures 315 separated from each other by opaque sections 316. The number and spacing of the light transmitting slots 315 are such as to enable the light beam 275 emanating from the lamp 270 to be transmitted to phototransducer 272 by adjacent slots 315 of the rotating disk 276 with a periodicity that is the same as that of the successive sensing by the phototransducer 210 of contiguous information bit positions 31 of information ring 26. This enables the phototransducer 272 to generate the necessary electrical timing signals in synchronism with the sequential sensing of the bit positions 31, assuming the timing signals and sequential sensing are properly phased with respect to each other.

In the preferred embodiment wherein the timing disk 276 is driven at the same angular speed as the scanning assembly 100 and, hence, at the same angular speed as the fiber optic means 184 and phototransducers 210–212, the number and spacing of slots 315 are designed to correspond to the number and spacing of the information bit positions 31 formed in the information ring 26. Specifically, sixty-two equally spaced slots 315 are provided in the outer marginal portion 278 of the disk 276 corresponding to the sixty-two information bits 31 formed in the information ring 26. With the number and spacing of the slots 315 so selected, each revolution of the timing disk 276 generates sixty-two timing pulses, the pulses being generated as each slot 315 passes between the lamp 270 and the phototransducer 272, permitting the phototransducer to be illuminated by the beam 275.

Generation of a timing signal by the phototransducer 272 in response to irradiation by the beam 275 when a slot 315 passes between the lamp 270 and transducer may be effected in any desired manner. For example, if the phototransducers are photoconductive, timing pulses can be generated by monitoring the voltage drop developed across a fixed resistor connected in series with the transducer and a source of potential.

To synchronize the generation of timing signals produced by the periodic passage of slot 315 intermediate the phototransducer 272 and the lamp 270 with the photosensing of the information bit positions 31 of the information ring 26 by transducer 210, the teeth 308 and the slots 315 are positioned to bear a predetermined relation to each other. This relation is such that when the electromagnet 301 is energized, disengaging the free end 307 and the toothed disk 276 and initiating rotation of the disk 276, the passage of the slots 315 between the phototransducer 272 and the lamp 270 is coincident with the passage of information bit positions 31 beneath the lower end 205 of the sensing fiber optic group 202. Energization of the electromagnet 301 at the appropriate time, to effect the aforementioned synchronism between the generation of the timing signals by transducer 272 and the photosensing of mark receiving positions 31 of the information ring 26, is accomplished by means of the start mark 27 and the mark 34. These marks are positioned such that when they are sensed by the phototransducers 210 and 212, a start signal is generated in a manner to be described, which is effective to timely energize the electromagnet for producing the desired synchronism between the generation of the timing signals and the sensing of the information bit positions.

The logic circuit 400, as shown more particularly in FIGURES 19A and 19B, includes a clock start circuit 401. This circuit energizes the electromagnet 301, disengaging the free end 307 of the solenoid armature 303 from the toothed periphery of the timing disk 276, and thereby initiating generation of the timing signals by the passage of the slots 315 intermediate the lamp 270 and the phototransducer 272. The clock start circuit 401 includes a Flip-Flop 402, a NAND gate 403 and a Flip-Flop 404. The Flip-Flop 402 is preferably of the type marketed by Texas Instruments, Incorporated, designated Model SN7474, which is shown in detail in FIGURE 25 connected in a manner to operate in accordance with the truth table depicted in FIGURE 20. As used herein, a logical "0" represents a low voltage signal, herein termed a negative signal, and a logical "1" represents a high voltage signal more positive than said low voltage signal, herein termed a positive signal. Flip-Flop 402 has a first input terminal designated P which is responsive to an input line 405 from a suitable utilization device 399, such as a buffer memory for a computer, cash register or the like, and a second input terminal designated R which is responsive to input line 406 connected to a reset circuit 408. Flip-Flop 402 also has an output terminal designated Q which is connected to line 409, and unused terminals designated Q, CL and D. A negative signal to Flip-Flop 402 on line 405 produces a positive signal on output line 409, while a negative signal on input line 406 produces a negative output signal.

The clock start circuit 401 also includes a NAND gate 403 having three inputs. One input is connected to line 409 while the other two inputs are connected to a data line 410 and a start line 411, respectively. Lines 410 and 411 are connected to scanning phototransducers 210 and 212 via contacts 231 and 233, wires 241 and 243, conductive rings 251 and 253, and brushes 263 and 265. The NAND gate 403 also includes an output terminal connected to line 412. The NAND gate 403, like other NAND gates to be described, is preferably of the type marketed by Texas Instruments, Incorporated, designated Model SN7410N, and operating in accordance with the truth table depicted in FIGURE 21.

A positive signal or pulse is produced on data line 410 when a photosensible mark 50 present in an information bit position 31 of the information ring 26 passes beneath the scanning aperture 195 formed in the disk 188 containing portions of the illuminating and sensing fiber optic groups 192 and 202, respectively. A positive signal or pulse is produced on start line 411 in response to the sensing, by phototransducer 212, of the photosensible start mark 27 which occurs when the mark 27 passes beneath the aperture 197 formed in the disk 188 and containing portions of the illuminating and sensing fiber optic groups 194 and 204, respectively.

A negative signal is produced on NAND gate 403 output on line 412 when positive signals are simultaneously present on lines 409, 410 and 411. This occurs when the start mark 27 and the mark 34 are opposite the scanning apertures 197 and 195 in the disk 198, respectively, and the positive enabling signal from the utilization device 399 such as the buffer memory is present. Other input conditions to NAND gate 403 produce a positive output signal on line 412.

The output from NAND gate 403 on line 412 is input to a terminal designated P of the Flip-Flop 404 which is structurally and operationally the same as the Flip-Flop 402. A negative input signal on line 412 functions to produce a positive signal at output terminal Q. The output terminal Q of Flip-Flop 404 is connected to line 413, which in turn is connected to the electromagnet 301. A positive signal on line 413 functions to energize the electromagnet 301, disengaging the free end 307 of the electromagnet armature 303 from the timing disk 276, enabling the timing disk to rotate and initiate the generation by the transducer 272 of negative timing or clock signals which are input to the logic circuit 400 on a clock or timing line 419. The Flip-Flop 404 further includes a second input terminal R connected to the reset circuit 408 via line 406. A negative signal on line 406 produces a negative signal on line 413, de-energizing the electromagnet 301 and thereby terminating the generation of clock signals on clock line 419. The Flip-Flop 404 also includes unused terminals CL, D, and $\overline{Q}$.

The logic circuit 400 also includes a data sampling circuit 420. This circuit is responsive to both data line 410 and the clock line 419 and functions to gate the data signals present on line 410 to a memory circuit generally indicated by the reference numeral 425 where it is temporarily stored and read out on a character-by-character basis in a manner to be described in detail hereafter. The data sampling circuit 420 includes the series connected combination of an inverter 422, a one millisecond delay circuit 423 which may, for example, be a conventional monostable multi-vibrator, an inverter 424, a buffer circuit 426, an inverter 427, and a NAND gate 428. The NAND gate 428, in addition to the input from the inverter 427 on line 429, has two additional inputs, namely, the data line 410 and the Flip-Flop 404 output line 413. A positive output signal on line 413, which is produced when the marks 34 and 27 are sensed and the utilization device 399 is readied, functions to enable the NAND gate 428. With the NAND gate 428 enabled, positive data signals input on data line 410 are gated to the memory circuit 425 on line 430 by the delayed clock signals on line 429. The delay introduced by the delay circuit 423 functions to delay the sampled data signal on line 430 with respect to the data signals on line 410 for reasons to be described hereafter.

The memory circuit 425 includes a five stage or position storage circuit 439 comprising five storage devices or Flip-Flops 441–445 each of which is preferably of the type marketed by Texas Instruments, Incorporated, designated Model SN7474, which is shown in detail in FIGURE 26 connected in a manner to be operative in accordance with the truth table depicted in FIGURE 24. Flip-Flops 441–445 each have two terminals P and $\overline{Q}$ which are connected to each other, and an input terminal R connected to a reset line 447. When a negative signal appears on reset line 447, which occurs approximately two milliseconds after bit position E of each character group 37–48 passes in sensing relationship to the aperture 195 associated with the transducer 210, those storage devices 441–445 in the set condition are switched to the reset condition, providing negative signals at their output terminals Q and on their respective output lines 441A, 442A, 443A, 444A and 445A.

The storage devices 441–445 further include sampled data input terminals CL each connected to the sample data line 430. When a negative signal on line 430 is present, which occurs when a photosensible mark 50 is present in an information bit position 31 of the information ring 26 opposite the aperture 195 associated with the phototransducer 210, and when the storage device is primed by a positive signal input to a priming terminal D, the storage device is switched from the reset state to the set state, producing a positive signal at the output terminal Q. A positive priming signal at terminal D of Flip-Flops 441–445 is necessary to permit the Flip-Flops to switch from the reset state in response to a negative input at terminal CL.

The memory 425 further includes five NAND gates 451–455. The NAND gates 451–455 each have a first input terminal connected in common to the reset circuit 408 via line 456, and a second input terminal connected to different ones of the storage device output lines 441A, 442A, 443A, 444A and 445A, respectively. When primed storage devices 441–445 are switched from the reset state by the presence of negative signals at their input terminals CL from the sampled data line 430, the positive outputs produced at terminals Q and present on output lines 441A–445A, respectively, are gated through their associated normally enabled NAND gate 451–455, respectively, producing negative signals on the NAND gate output lines 451A, 452A, 453A, 454A and 455A, respectively. The negative signals, in turn, are input to inverters 461, 462, 463, 464 and 465, respectively, producing positive signals on inverter output lines 461A, 462A, 463A, 464A and 465A, respectively, which constitute the output to the utilization device 399 of the memory circuit 425, when the Flip-Flops 441, 442, 443, 444 and 445 are reset, thus producing a negative output.

A five position ring counter, generally indicated by the reference numeral 470, is included in the memory circuit 425 for selectively and sequentially enabling the storage devices 441–445 in synchronization with the photosensing by the transducer 210 of the mark receiving information bit positions 31A–31E of the character groups 37–48. The counter 470 includes five Flip-Flops 471, 472, 473, 474 and 475 which are sequentially stepped by the clock pulses to successively enable different ones of the storage devices 441–445 in synchronism with the successive sensing of positions A–E of the character groups 37–48. The Flip-Flops 471–475 preferably are of the type marketed by Texas Instruments, Incorporated, designated Model SN7473, which is shown in detail in FIGURE 27 connected in a manner to operate in accordance with the truth table depicted in FIGURE 22.

Flip-Flops 471–475 each have two complementary output terminals Q and $\overline{Q}$ connected respectively to lines 471B and 471C, 472B and 472C, 473B and 473C, 474B and 474C and 475B and 475C. Output lines 471B and 471C, 472B and 472C, 473B and 473C and 474B and 474C of Flip-Flops 471–474, respectively, are connected, respectively, to the priming terminals J and K of Flip-Flops 472–475, and function to prime or enable the Flip-Flops 472–475 when the counter Flip-Flops 471–475 are in the set condition providing negative and positive signals at terminal $\overline{Q}$ and Q, respectively. The output lines 471B–475B are also connected, respectively, to the priming terminal D of storage devices 441–445 for priming their respectively associated storage devices when a positive signal is present at their respective output terminals Q.

The Flip-Flops 471–475 each have an input terminal CL connected to the clock line 419, the Flip-Flops 471 and 472 being connected via a line 484 and inverter 482 while Flip-Flops 473, 474 and 475 are connected via a line 490 and an inverter 491. A negative clock signal input to terminal CL of a Flip-Flop 471–475, assuming it is primed by positive and negative signals at terminals J and K, sets the Flip-Flop, producing positive and negative signals at output terminals Q and $\overline{Q}$. In addition, each of the Flip-Flops 471–475 have an input terminal R which is connected to the reset circuit 408. Flip-Flops 471 and 472 are connected to the reset circuit 408 via a line 492 while the Flip-Flops 473–475 are connected via line 494. A negative signal at terminal R resets the Flip-Flops 471–475, producing negative and positive output signals at terminals Q and $\overline{Q}$.

The counter 470 further includes a Flip-Flop 480 similar in structure and operation to Flip-Flops 402 and 404. Flip-Flop 480 has one input terminal P which is connected to the clock line 419 via the series connected combination including inverters 482 and 483 and lines 484 and 485. The Flip-Flop 480 further includes a second input terminal R which is connected to the reset circuit 408 via line 406. The output of the Flip-Flop 480 which is provided at terminal $\overline{Q}$ is input via a line 486 to a differentiating network 487. Terminal $\overline{Q}$ of Flip-Flop 480 is made positive and negative in response to negative signals input to terminals R and P, respectively. Flip-Flop 480 has unused terminals Q, D and CL.

Differentiating network 487 provides a differentiated output on line 488 to an inverter 477 which is also responsive to the output terminal $\overline{Q}$ via line 475C. The network 487 and the inverter 477 combine to provide a negative priming signal on line 500 to terminal J of Flip-Flop 471 when Flip-Flop 480 is set by a negative clock signal on line 485, producing a negative signal at output terminal $\overline{Q}$. A positive priming signal to the other priming terminal K of Flip-Flop 471 is provided on line 475C by reset Flip-Flop 475.

In operation, prior to the start of a reading cycle, the counter Flip-Flops 471–475 and 480 are reset by negative signals on one or more of the reset lines 492, 406 and 494 output from the reset circuit 408. Such reset signals are generated in response to a variety of reset conditions to be described in detail hereafter, such as the removal of a tag 14 from the read station 16 permitting the probe 12 to extend, completing a reading operation, etc. Flip-Flops 471–475 and 480 when in the reset condition provide negative signals on output lines 471B–475B and positive signals on lines 471C–475C and 486. The negative signals present on lines 471B–475B are input to terminals D of the storage devices 441–445, respectively, disabling these storage devices. Consequently, the storage devices 441-445 are rendered unresponsive to any sampled data signals input thereto from line 430 should such exist. The output of reset Flip-Flop 475 at terminal $\overline{Q}$ which is directly connected back to the priming input K of Flip-Flop 471 and indirectly connected back to the priming input J via line 475C and inverter 477, functions to partially prime Flip-Flop 471. The outputs at terminals Q and $\overline{Q}$ of Flip-Flops 471-474, which are negative and positive, respectively, are input to the terminal J and K of Flip-Flops 472-475, disabling these Flip-Flops. Thus, with all the Flip-Flops 471-475 reset, only Flip-Flop 471 is partially primed, the other Flip-Flops 472-475 being fully unprimed.

Upon the occurrence of the first negative clock signal on line 485, which is coincident with the photosensing of the information bit position A of character group 37, the Flip-Flop 480 is switched from the reset state, providing a negative signal on line 486 to the differentiating network 487 which casues a negative signal to be produced on output line 488. This negative signal is input on line 488 to the inverter 477, producing a positive signal on inverter output line 500 which is in turn connected to the previously unprimed terminal J of the Flip-Flop 471. The positive signal on inverter 477 output line 500, produced as a consequence of the first clock signal, in combination with the negative signal on line 475C, satisfies the priming requirements for Flip-Flop 471. With the Flip-Flop 471 fully primed, it switches from the reset condition in response to the first negative clock signal which is applied to terminal CL via line 484.

With the Flip-Flop 471 switched from the reset condition, the complementary outputs on lines 471B and 471C switch to positive and negative signals, respectively, which, as a consequence of being input to the priming terminals J and K of Flip-Flop 472, fully prime Flip-Flop 472 enabling it to switch from the reset state upon the occurrence of the second negative clock signal on line 484. Flip-Flops 473-475 remain reset and unprimed. The first clock signal on lines 484 and 485, which is effective to switch Flip-Flops 471 and 480, is ineffective to also switch Flip-Flop 472 since the latter Flip-Flop only becomes primed when the Flip-Flop 471 switches.

The positive output of the switched Flip-Flop 471 on line 471B is also input to the first storage device 441 priming this storage device. Should a photosensible mark 50 be present in the information ring 26 in bit position A of character group 37, a positive data signal on line 410 is produced which, when delayed, gated and inverted by the data sampling circuit 420, produces a negative signal on sampled data line 430 which is input to each of the storage devices 441-445. With only storage device 441 primed during the period of the first clock pulse, a delayed and sampled data signal on line 430, if present, although input to all of the storage devices 441-445, functions to switch from the reset state only storage device 441. Consequently, should a photosensible mark 50 be present in information bit position A of character group 37, it is stored in storage device 441, since this device only is primed by a positive signal on line 471B of Flip-Flop 471 which is switched by the first clock pulse.

The generation of the second clock pulse produces a negative signal on line 484 which is effective to switch Flip-Flop 472, Flip-Flop 472 having previously been primed by the switching of Flip-Flop 471 from the reset state by the first clock pulse. With Flip-Flop 472 switched from the reset state, negative and positive signals are output on lines 472B and 472C to the priming terminals J and K of Flip-Flop 473, priming the Flip-Flop 473. In addition, a positive signal is input on line 472B to the storage device 442, priming this storage device. Flip-Flop 471 returns to its reset condition following the switching from the reset state of Flip-Flop 472. Thus, storage device 441 is no longer primed on line 471B by the Flip-Flop 471 and therefore is unable to switch from the reset state and store a data signal, should one be input thereto on line 430 during the time of the second clock pulse.

Since Flip-Flop 442 is primed during the period of the second clock pulse, should a delayed data signal be input thereto on line 430, the storage device 442 will switch from the reset state, storing the data signal. Such a data signal during the period of the second clock pulse will be present on line 430 if a photosensible mark 50 is present in information bit position B of character group 37.

In like manner, the counter Flip-Flops 473-475 are sequentially switched from the reset state by the third, fourth, and fifth clock pulses, sequentially enabling the third, fourth and fifth storage devices 443-445, permitting the storage of data signals during the third, fourth and fifth clock intervals should such data signals be input thereto on line 430 as a consequence of photosensible marks 50 being present in information bit positions C, D and E of character group 37.

The delay of the data signals on line 410 introduced by the delay circuit 423 is necessary to permit the storage devices 441-445 to be primed by the clock pulse responsive counter Flip-Flops 471-475 prior to feeding the data pulses to the storage devices 441-445, thereby enabling the storage devices to switch and store the data.

The switching of Flip-Flop 475 as a consequence of the fifth clock pulse, in addition to priming storage device 445 via line 475B, is also effective to produce a parallel readout of the storage devices 441-445 via a readout circuit 510. The readout circuit 510, which is responsive to the output on line 475B of storage device 475, includes the series combination of a two millisecond delay circuit 511 preferably in the form of a monostable multi-vibrator, an inverter 512, a buffer circuit 513, a NOR circuit 514 and an inverter 515. The NOR circuit 515, like other NOR gates to be described, operates in accordance with the truth table depicted in FIGURE 23.

The readout circuit 510 serves to provide on line 447 a negative reset signal for resetting the storage devices 441-445. The reset signal on line 447 is slightly delayed with respect to the fifth clock pulse to permit, prior to readout of the storage devices 441-445 by the reset signal, storage in the fifth storage device 445 of a data signal input thereto on line 430 during the fifth clock pulse interval should one be present as a consequence of a photosensible mark 50 occupying information bit position E of the character group 37.

The negative reset signal on line 447 produced by the readout circuit 510 switches to the reset condition those storage devices 441-445 which have previously been switched from the reset state during the first five clock intervals by sampled data signals appearing on line 430 as a consequence of the sensing marks 50 in information bit positions A-E of the character group 37. The resetting of those storage devices 441-445 in which information is stored returns the signal level on their respective output lines 441A-445A to a negative level, the output of a storage device in which data is stored being at a positive level prior to being reset. The change, upon resetting, of the signal levels on output lines 441A-445A of those storage devices 441-445 in which information is stored constitutes an input to the normally enabled NAND gates 451-455, providing positive signals on NAND gate output line 451A and 455A which, when inverted by inverters 461-465, provide negative signals on lines 461A-465A to the utilization device 399. The utilization device 399, by using suitable circuit techniques, is made responsive to only negative input signals. Thus, while positive signals are input to the utilization device 399 when a storage device 441-445 is set by entry of a stored data signal, the utilization device responds to only the negative signals input thereto which occur when set storage devices are reset in parallel during a readout.

The sixth clock pulse switches counter Flip-Flop 471 from the reset state, the Flip-Flop 471 having been primed by the output of Flip-Flop 475 on line 475C which is directly input to one of the priming terminals K of Flip-Flop 471 and indirectly input to terminal J of Flip-Flop 471 on line 500 following inversion by inverter 477. The switching of Flip-Flop 471 from the reset state primes the first memory stage 441 during the interval corresponding to the sixth clock pulse, enabling storage of a data signal input thereto on line 430 should one be present as a consequence of a photosensible mark 50 being present in information bit position A of character group 38. In like manner, the seventh, eighth, ninth and tenth clock pulses switch counter Flip-Flops 472, 473, 474 and 475 priming and enabling memory stages 442, 443, 444 and 445 to store data signals input thereto on line 430 corresponding to photosensible marks sensed in bit positions B–E of character group 38. The tenth clock pulse is also effective, following a delay introduced by monostable multivibrator 511, to produce an output on line 447 of the reset circuit 510 which causes a parallel readout to the utilization device 399 via enabled NAND gates 451–455, lines 451A–455A, inverters 461–465 and lines 461A–465A of the information stored during the fifth through tenth clock intervals.

In like manner, the 11th–15th, 16th–20th, 21st–25th, 26th–30th, 31st–35th, 36th–40th, 41st–45th, 46th–50th, 51st–55th and 56th–60th clock pulses successively recycle the counter Flip-Flops 371–375, sequentially and periodically enabling the storage devices 441–445 for permitting the storage of data signals input thereto on line 430 produced as a consequence of the sensing of photosensible marks in bit positions A–E of character groups 39–48. In addition, the 15th, 20th, 25th, 30th, 35th, 40th, 45th, 50th, 55th and 60th clock pulses, after a brief delay introduced by the monostable multi-vibrator 511 of the readout circuit 510, produce successive readouts of the information stored in the storage devices 441–445 during sensing of character groups 39–48.

A character counting circuit 520 is also included in the logic circuit 400. The circuit 520 functions to provide an output signal on line 548, in this case a positive signal, in response to the receipt on input lines 451A–454A of a total of twelve input signals, in this case positive signals. The character counting circuit 520 includes a NOR gate 521 which is operative in accordance with the truth table depicted in FIGURE 23. NOR gate 521 is responsive to the outputs on lines 451A–455A produced during the 5th, 10th, 15th . . . 60th clock periods when the storage devices 441–445 are readout in parallel, and produces an output line 522 a negative signal each time one or more information signals is readout from the storage devices 441–445 during a given readout interval. Thus, if each of character groups 37–48 is encoded with data and the tag 14 is properly read, information signals are readout in parallel from storage devices 441–445 during the 5th, 10th, 15th . . . 60th clock intervals providing twelve successive character signals on line 522 corresponding to the readout of the twelve characters encoded in the character groups 37–48.

The character counting circuit 520 further includes a "divide by twelve" circuit 524. Circuit 524 preferably is a four position binary counter which automatically recycles at a twelve count, providing negative signals at all four output lines 525, 526, 527 and 528. Such a counter is marketed by Texas Instruments, Incorporated, and is designated Model SN7492. The counter 524 includes two reset terminals R connected to the reset circuit 408 via line 541. Positive inputs to both terminals R reset the counter 524, producing negative signals on all output lines 525–528. The character counting circuit 520 is also provided with a NAND gate 534 which is responsive via inverters 529–532 to the simultaneous presence of four negative outputs on lines 525–528 corresponding to a count of twelve, and produces an output line 535 a negative signal each time the count of twelve is produced in the counter 524. The output of the NAND gate 534 is input on line 535 to an inverter 536 where it is inverted for subsequent use by the reset circuit 408.

The reset circuit 408 includes a NOR gate 540 which produces on output line 541 a positive reset signal to, among other things, reset the counter 524. The reset signal on line 541 is generated in response to a negative signal on either a probe switch line 542 or a line 544 output from the NAND gate 545. A negative signal on probe switch line 542 is produced when the probe 12 is returned to its normal position in response to removal of a tag from the read station 16 and the switch 165 deactivated. A negative signal is produced on input line 544 upon the coincidence of positive inputs on all three input lines 547, 548 and 472B corresponding to the presence of input signals on start line 411 and data line 410 which provide an output on line 547 via output line 549 to inverter 550, an output on line 548 from the character counting circuit 520 indicative of the sensing of twelve characters, and an output on line 472B from the second counter position Flip-Flop 472 indicative of the sensing of the 62nd clock pulse.

The reset circuit 408 further includes four inverters 450, 407, 551 and 552 each responsive to the output on line 541 from the NOR gate 540. The inverters 450, 551, 552 and 407 provide reset outputs on lines 456, 492, 494 and 406, respectively. The reset output on line 456 is input to NAND gates 451–455 for inhibiting a readout from the memory storage stages 441–445. The reset output on line 406 is input to the Flip-Flops 402 and 404 for resetting these Flip-Flops. Resetting the Flip-Flop 402 inhibits the NAND gate 403. Resetting the Flip-Flop 404 provides a negative signal on output line 413 which de-energizes the electromagnet 301, causing the free end 307 of the armature 301 to engage the timing wheel 276 and thereby terminate the generation of clock signals on line 419. The resetting of Flip-Flop 404 also inhibits the NAND gate 428, preventing the gating of data signals present on line 410 to the storage devices 441–445. The reset signal on line 406 is also input to the Flip-Flop 480 of the ring counter 470, resetting this Flip-Flop which in turn produces a positive signal on line 486 which, when input to the inverter 477, produces a negative input signal on line 500 to the Flip-Flop 471 unpriming this Flip-Flop. The reset output signal on line 492 is input to the Flip-Flops 471–472 on the counter 470, resetting these Flip-Flops and in turn producing on output lines 471B and 472B negative signals which inhibit storage devices 441–442 of the memory. The reset signal output on line 494 is input to the Flip-Flops 473–475 of the counter 470, resetting these Flip-Flops and in turn producing negative signals on output lines 473B–475B which inhibit storage devices 443, 444 and 445.

The negative output signal on line 544 from the NAND gate 545, in addition to being input to NOR gate 540, is also input to a terminal P of a Flip-Flop 560, causing this Flip-Flop to switch from the reset state. When switched from the reset state, Flip-Flop 560 produces a positive signal on output line 561 to the indicating lamp 17, providing a visual signal to the operator indicating the completion of the tag reading operation. The Flip-Flop 560 also includes a reset terminal R. Terminal R is responsive to the probe switch output on line 542, and returns the Flip-Flop 560 to the reset state in response to a negative signal on line 542 caused by the return of the probe to its normal extended position when a tag 14 is removed from the read station 16. When the Flip-Flop 560 is placed in the reset condition by a negative output on line 542, a negative signal is provided on output line 561 to the lamp 17 for extinguishing the lamp, and thereby readying the reader 9 for the next tag reading cycle. Flip-Flop 560 is similar in operation and structure to the Flip-Flops 402, 404 and 480, and contains unused terminals CL, D, and $\overline{Q}$.

A Flip-Flop circuit suitable for use as the Flip-Flop 402, 404, 480 or 560 is depicted in FIGURE 25. The Flip-Flop circuit of FIGURE 25, which is marketed by Texas Instruments, Incorporated and designated Model SN7474, operates in accordance with the truth table depicted in FIGURE 20. The preferred Flip-Flop circuit includes four input lines designated P, R, CL and D connected, respectively, to NAND gates 600–603 and two output lines designated Q and $\overline{Q}$ connected to NAND gates 604 and 605, the NAND gate 600–605 being interconnected in the manner shown. The input lines CL and D and one of the output lines Q and $\overline{Q}$ of the Flip-Flop depicted in FIGURE 25 are not utilized when this Flip-Flop circuit is used for either of the Flip-Flops 402, 404, 480 and 560.

A preferred Flip-Flop circuit suitable for use as the Flip-Flop 441, 442, 443 or 445 of the memory is depicted in FIGURE 26. The preferred Flip-Flop circuit depicted in FIGURE 26, which is marketed by Texas Instruments, Incorporated and designated Model SN7474, operates in accordance with the truth table of FIGURE 24 when interconnected in the manner shown. The Flip-Flop of FIGURE 26 includes four input lines designated P, R, CL and D which are connected to NAND gates 610–613, respectively, and two output lines Q and $\overline{Q}$ which are connected to NAND gates 614 and 615, the NAND gates 610–615 being interconnected in the manner shown. When the Flip-Flop of FIGURE 26 is utilized as one of the memory Flip-Flops 441–445, the output terminal $\overline{Q}$ and the input terminal P are connected to each other.

A preferred Flip-Flop circuit suitable for use as one of the Flip-Flops 471–475 of the counter 470 is depicted in FIGURE 27. The Flip-Flop of FIGURE 27, which is marketed by Texas Instruments, Incorporated and designated Model SN7473, operates in accordance with the truth-table depicted in FIGURE 22. The Flip-Flop circuit of FIGURE 27 includes four input lines J, K, CL and R and two output lines Q and $\overline{Q}$. Input lines J and K are connected to AND gates 616 and 617, respectively; input line R is connected to NAND gates 616 and 618; input line CL is connected to transistors 619 and 620 and AND gates 616 and 617; and output lines Q and $\overline{Q}$ are connected to NAND gates 621 and 622. Two NOR gates 623 and 624 interconnect transistors 623 and 624 and AND gates 616–618. The Flip-Flop circuit depicted in FIGURES 27 when used as one of the memory Flip-Flops 471–475 has all of its input and output terminals utilized and connected in the manner shown in FIGURE 19B.

The terminals of the Flip-Flop circuits of FIGURES 25–27 are designated to correspond to like designated terminals of the Flip-Flops of FIGURES 19A and 19B for which they are suitable.

In operation, the user grasps the housing 10 of the reader 9 and engages the tip 13 of the probe 12 with the aligner 11 formed in the information-bearing surface 19 of the tag 14. The tag 14 is then advanced to the read station 16 of the reader 9 by relatively moving the reader and tag, preferably by moving the reader toward the tag until the information-bearing surface 19 of the tag is in contact with the exterior surface of the disk 105. Movement of the tag 14 to the read station 16 in the manner described is effective to drive the probe 12 from its normal extended position depicted in FIGURE 5 to its retracted position depicted in FIGURE 6. With the probe 12 in the retracted position the conductive conical tip 167 of the probe electrically bridges the spring contacts 166A and 166B of the motor switch 165, energizing the motor 124. When the motor 124 becomes energized, the gear box output shaft 126 drives the drive gear 127, in turn rotating the driven gear 128 and the scanning assembly 100 of which it forms a part.

Bridging of switch contacts 166A and 166B by the retracted conical conductive tip 167 of the probe 12, in addition to energizing the motor 124 and driving the scanning assembly 100, is also effective to complete an energization circuit to the tag illuminating lamp 183 via the brushes 139 and 140, slip rings 135 and 136, wires

143 and 144, contacts 186 and wires 173 and 174. With the lamp 183 illuminated, light is directed onto the ends 191 of the illuminating group of optical fibers 190, transmitting light through the illuminating group of optical fibers 192 and 194 to the information ring 26 and the ring 25.

As the scanning assembly 100 rotates, the information and start rings 26 and 25 are sensed. Sensing is accomplished by capturing reflected light with the sensing ends 205 and 207 of the sensing fiber optic groups 202 and 204 and subsequently transmitting the reflected and captured light to the phototransducers 210 and 212. Transducers 210 and 212 in turn produce positive signals each time a photosensible mark is sensed. These signals are transmitted to the data line 410 and the start line 411 of the logic circuit 400 via contacts 231 and 233, wires 241 and 243, conductive rings 251 and 253, and brushes 263 and 265.

When the scanning assembly 100 has rotated to a point wherein the ends 205 and 207 of the sensing fiber optic groups 202 and 204 are aligned with the marks 34 and 27, positive signals are simultaneously produced by transducers 210 and 212 and input on data and start lines 410 and 411 to the logic circuit 400. Assuming the utilization device 399 is in a readied condition, the Flip-Flop 402 is in the set state, providing a positive output on line 409 to the NAND gate 403, enabling this gate. With NAND gate 403 enabled, the concurrence of the positive signals on data and start lines 410 and 411 in response to the sensing of the marks 34 and 27 by transducers 210 and 212 is effective to provide a negative signal on line 412 which places the Flip-Flop 404 in the set state. With Flip-Flop 404 in the set state, a positive output is produced on line 413 which is input to the electromagnet 301, energizing the electromagnet. This in turn pivots the armature 303 counterclockwise, as viewed in FIGURE 4, disengaging the armature's free end 307 from the toothed periphery of the timing disk 276. The timing disk 276 once disengaged immediately starts rotating as a consequence of being driven through the spring-biased friction disks 282 and 283. Rotation of the timing disk 276 initiates generation of the negative clock pulses on line 419 as a consequence of the passage of slots 315 between the lamp 270 and the phototransducer 272 which permits bursts of light from the lamp to be incident on the phototransducer.

The output from the set Flip-Flop 404 on line 413 is also input to the NAND gate 428, partially enabling this gate. With gate 428 partially enabled, the delayed clock pulses output from the data sampling circuit on line 429 sample and gate the data signals present on line 410 to each of the storage devices 441–445 via sampled data line 430.

The clock pulses generated on line 419, in addition to sampling data in NAND gate 428, are also input to inverters 491 and 482 which provide inverted clock pulses to the counter 470 to initiate the cycling of the counter and the consequent sequential enabling of storage devices 441–445 in a manner described in detail previously.

The generation of the negative clock pulses on line 419 by the timing means 107 continues in synchronism with the sensing of the information bit positions A–E of each of the character groups 37–48 by the sensing fiber optic groups 202 and 204 and the transducers 210 and 212. The synchronous sensing of the informtion bit positions and the generation of the timing signals recycles the counter 470 twelve times, which in turn successively enables the storage devices 441–445 for twelve cycles, permitting the sensed marks in the information ring 26 to be successively stored in the appropriate ones of the storage devices 441–445 and readout of the utilization device 399, the readout being parallel-by-bit and serial-by-character.

When the 12th character has been read from the memory 425, the character counting circuit 520 provides an output on line 548 to the reset circuit 408. This output on line 548, in combination with an input on line 547 indicative of the sensing of the start mark 27 and the mark 34 and an output on line 472B indicative of the set condition of the signal counter Flip-Flop 472, produces an output from the NAND gate 545 on line 544. This NAND gate output in turn sets the Flip-Flop 560, providing a positive output on line 561 to the indicator lamp 17, illuminating this lamp and providing a visual indication to the operator that the reading cycle is completed.

The output on line 544 from NAND gate 545 also produces an output on line 541 from the NOR gate 540. This NOR gate output directly resets the counter 524 and, via the inverters 551, 552 and 407, is operative to reset the Flip-Flops 471–475 and 480 of the counter 470 and inhibit the NAND gates 451–455. This in turn prevents the storage in, or readout of, information from the storage devices 441–445. The NOR gate output on line 541, via inverter 407, also resets the Flip-Flops 402 and 404. This in turn de-energizes the electromagnet 301 which terminates the generation of the timing signals and disables the NAND gate 428 which prevents the sampling of data.

When the lamp 17 becomes illuminated, the operator removes the tag 14 from the read station 16 by withdrawing the reader 9. As the reader 9 is withdrawn, the probe 12 extends. This in effective to electrically decouple the spring contacts 166A and 166B of the switch 165, de-energizing the motor 124. This in turn terminates rotation of the scanning assembly 100. In addition, upon return of the probe 12 to its normally extended position, a signal is provided on line 543 resetting the Flip-Flop 560 which in turn provides a negative signal level on line 561, de-energizing the lamp 17 and readying the reader 9 for another tag reading operation.

Should the tag 14 be removed from the read station at any time prior to completion of a complete tag reading cycle, a negative signal is produced on line 542 by the switch 165. This signal is input to the NOR gate 540, producing a positive output signal on line 541. The positive output signal on line 541 is effective to reset the entire logic circuit in a manner described previously.

While the invention has been described with respect to a preferred embodiment, those skilled in the art will appreciate that a number of modifications can be made therein without departing from the spirit and scope of this invention. For example, the preferred embodiment has been described with respect to the sensing information in only one information ring, namely, sensing information in information ring 26. It is contemplated that more than one information ring may be provided. For example, an information ring may be provided on the information bearing surface 19 of a tag 14 intermediate the information ring 26 and the ring 25. If such an optional and additional information ring is provided, the illuminating and sensing fiber optic groups 193 and 203, as well as the phototransducer 211 and associated circuitry therefor, are used. In addition, a second set of storage devices analogous to and operating in parallel with storage devices 441–445 are provided, as well as associated circuitry for gating, from the second set of storage devices to the utilization device 399, information sensed in the intermediate or optional information ring.

It is also contemplated that instead of a rotating timing disk 276 and a stationary lamp and transducer assembly 270 and 272, a rotating lamp and transducer combination may be used in conjunction with a stationary timing disk. It is further contemplated that instead of providing as many slots 315 in the timing disk 276 as there are bit positions 31 in the information rings 26, fractional or whole number multiples may be used. For example, it is contemplated that thirty-one timing slots 315 may be provided in the disk 276 in conjunction with means for rotating the timing disk 276 at an angular speed twice that at which the illuminating and sensing end of fiber optic means 184 are driven, or in conjunction with means for frequency doubling the thirty-one timing signals generated by the timing disk each revolution.

It is also contemplated that means other than photo-optic means may be provided for generating the timing pulses. For example, it is contemplated that instead of the combination of apertures 315, lamp 270 and phototransducer 227, a plurality of equally circumferentially spaced electrical contacts may be provided on the timing disk 276 which are successively wiped by a stationary electrical contact, periodically completing an electrical circuit and thereby generating the timing pulses. Alternatively, the contact-bearing disk 276 may be stationary and the wiping contact rotated.

It is also contemplated that a variety of optically contrasting schemes may be utilized for the tag surface 19 and the marks 51 other than the black and white arrangement conventionally used in photosensing systems.

It is also considered to be within the scope of this invention to produce energization of the motor 124 and the illuminating lamp 183 by means other than a retractable probe 12 cooperating with a pair of bridgeable electrical contacts 166A and 166B. For example, the motor 124 and lamp 183 may be continuously energized. With the motor 124 and lamp 183 so energized, the logic circuit 400, particularly the character counting circuit 520, insures that the information 15 on each tag is read and input to the utilization device 399 only once. With such an arrangement, the start of a tag reading cycle is initiated each cycle by a suitably positioned, operator-actuated switch, such as a trigger on the reader housing 10, a foot treadle, etc.

It is also contemplated that instead of the switch 165 the reader 9 could be provided with a switch which is located at the read station 16 in a position such that it is actuated by the presence of a tag against the window 105, initiating and terminating operation of the motor 124 and lamp 183 when the tag is positioned at, and withdrawn from, the read station.

We claim:

1. Apparatus for reading a tag having photosensible mark receiving positions arranged in concentric circular patterns symmetrically relative to an aligner formed on the tag, said apparatus comprising:

a support, means mounted on said support and engageable with said aligner for properly locating a tag in a read position, sensing means mounted to said support in photosensing relationship to the concentric circular patterns of a tag located in said read position for sequentially photosensing the mark receiving positions of said patterns, and selectively operable timing means responsive to the sensing of a mark on said tag for generating timing signals in synchronism with the sequential photosensing of said mark receiving positions.

2. The apparatus of claim 1 wherein said timing means includes a timing member movable in synchronism with the sequential photosensing of said mark receiving positions, and an electrical signal generating circuit responsive to the movement of said timing member for generating said electrical timing signals in synchronism with the sequential photosensing of said mark receiving positions.

3. The apparatus of claim 2 wherein said electrical signal generating circuit has a stationary input actuable to produce a timing signal, and wherein said movable timing member has a plurality of actuating elements for sequentially actuating said input of said electrical signal generating circuit to produce timing signals in synchronism with said sequential photosensing.

4. The apparatus of claim 3 wherein said sensing means is rotatably mounted to said support for sequentially moving relative to said mark receiving positions of said tag pattern to effect said sequential photosensing, and wherein said movable timing member is rotatably mounted to said support for movement in synchronism with said movable sensing means in response to the sensing of a mark on said tag.

5. The apparatus of claim 4 further including common drive means for rotating said sensing means and said timing member, and selectively operable coupling means interconnecting said drive means and said timing member, said coupling means being operative in response to the sensing of said mark for initiating rotation of said timing member and thereby synchronizing movement of said sensing and timing members.

6. The apparatus of claim 2 wherein one of said electrical signal generating circuit and movable timing member includes a phototransducer and a source of light for directing a light beam toward said phototransducer, and wherein the other of said movable timing member and electrical signal generating circuit includes means for interrupting said light beam in synchronism with said sequential photosensing of said mark receiving positions.

7. The apparatus of claim 6 wherein said means for interrupting said light is an opaque disc having a plurality of light-transmitting slots, said disc being positioned to interrupt said light beam when said disc and beam are relatively moved.

8. A self-timed system for reading photosensible information comprising:

a tag having (a) photosensible mark receiving positions arranged in concentric circular patterns symmetrically relative to an aligner formed on the tag, and (b) a photosensible mark imprinted on said tag in predetermined relation to said positions, a support, means mounted on said support and engageable with said aligner for properly locating a tag in a read position, sensing means mounted to said support in photosensing relationship to the concentric circular patterns of a tag located in said read position for sequentially photosensing the mark receiving positions of said patterns, and timing means including (a) a selectively operable timing member movable in synchronism with the sequential photosensing of said mark receiving positions in response to the sensing of said imprinted mark, and (b) an electrical signal generating circuit responsive to the movement of said timing member for generating electrical timing signals in synchronism with the sequential photosensing of said mark receiving positions.

9. The system of claim 8 wherein said signal generating circuit and movable timing member includes a phototransducer and a source of light for directing a light beam toward said phototransducer, and wherein the other of said movable timing member and electrical signal generating circuit includes means for interrupting said light beam in synchronism with said sequential photosensing of said mark receiving positions.

10. Apparatus for reading a tag having a circular sensible data receiving region symmetric with an aligner formed in the tag, said region including encoded message data and start data, said apparatus comprising:

a support, means mounted on said support and engageable with said aligner for properly locating a tag in a read position, sensing means mounted to said support in sensing relation to said message data and start data for sequentially sensing said data, means for detecting said start data, and timing signal generating means responsive to said detecting means for internally generating timing signals in synchronism with the sequential sensing of said encoded message data.

11. Apparatus for reading a tag having encoded information arranged in a circular pattern symmetric to an aligner formed on the tag, said encoded information having a beginning, said apparatus comprising:

a support, means mounted on said support and engageable with said aligner for properly locating a tag in a read position, sensing means mounted to said support in sensing relationship to said encoded information of a tag located in said read position for sequentially sensing said encoded information, means for producing an electrical signal at a point corresponding to said beginning of said encoded information, and timing signal generating means responsive to said signal producing means for internally generating timing signals in synchronism with the sequential sensing of said encoded information.

References Cited

UNITED STATES PATENTS

| | | | |
|---|---|---|---|
| 3,325,594 | 6/1967 | Goldhammer et al. | 250—227 X |
| 3,229,075 | 1/1966 | Palti. | |
| 3,334,236 | 8/1967 | Bacon | 250—227 X |
| 3,335,287 | 8/1967 | Hargens | 250—227 |
| 3,238,501 | 3/1966 | Mak et al. | |

DARYL W. COOK, Primary Examiner

U.S. Cl. X.R.

250—219, 227